(12) United States Patent
Compton et al.

(10) Patent No.: US 7,318,524 B2
(45) Date of Patent: Jan. 15, 2008

(54) OXYGEN SCAVENGING FORM/FILL/SEAL PACKAGE FOR LIMITED LIFETIME OPTICAL DATA STORAGE MEDIA

(75) Inventors: Stephen F. Compton, Spartanburg, SC (US); Drew V. Speer, Simpsonville, SC (US); Brian L. Butler, Bloomington, MN (US); Janet W. Rivett, Simpsonville, SC (US); Scott W. Beckwith, Greer, SC (US); Frank B. Edwards, Simpsonville, SC (US); Thomas D. Kennedy, Simpsonville, SC (US); Ronald L. Cotterman, Greenville, SC (US)

(73) Assignee: Cryovac, Inc., Duncan, SC (US)

( * ) Notice: Subject to any disclaimer, the term of this patent is extended or adjusted under 35 U.S.C. 154(b) by 325 days.

(21) Appl. No.: 10/746,625

(22) Filed: Dec. 24, 2003

(65) Prior Publication Data

US 2005/0145512 A1    Jul. 7, 2005

(51) Int. Cl.
*B65D 85/57* (2006.01)

(52) U.S. Cl. .............................. 206/308.1; 206/308.2; 206/308.3

(58) Field of Classification Search ............. 206/308.1, 206/308.2, 308.3, 484; 720/715, 719, 736; 369/291, 291.1
See application file for complete search history.

(56) References Cited

U.S. PATENT DOCUMENTS

| | | |
|---|---|---|
| 5,211,875 A | 5/1993 | Speer et al. |
| 5,310,497 A | 5/1994 | Ve Speer et al. |
| 5,316,949 A | 5/1994 | Bull et al. |
| 5,350,622 A | 9/1994 | Speer et al. |
| 5,399,289 A | 3/1995 | Speer et al. |
| 5,483,819 A | 1/1996 | Barmore et al. |
| 5,815,484 A | 9/1998 | Smith et al. |
| 5,896,994 A | 4/1999 | Krebs |
| 5,942,297 A | 8/1999 | Speer et al. |
| 6,011,772 A | 1/2000 | Rollhaus et al. |
| 6,071,626 A | 6/2000 | Frisk |
| 6,338,933 B1 | 1/2002 | Lawandy et al. |
| 6,343,063 B1 | 1/2002 | Rollhaus et al. |
| 6,523,683 B1 | 2/2003 | Fraser et al. |
| 6,678,239 B2 | 1/2004 | Clemens |

(Continued)

FOREIGN PATENT DOCUMENTS

JP    11334783    12/1999

(Continued)

*Primary Examiner*—David T. Fidei
(74) *Attorney, Agent, or Firm*—Mark B. Quatt

(57) ABSTRACT

A package includes a non-thermoformed thermoplastic pouch including a first and second panel; and an optical data storage medium disposed in the pouch; wherein the pouch comprises an oxygen barrier material, and an oxygen scavenger. Two methods of making a package include (1) providing a web; providing an optical data storage medium; forming a non-thermoformed pouch from the thermoplastic web, the pouch comprising a first and second panel; placing the optical data storage medium in the pouch; and sealing the pouch; wherein the web includes an oxygen barrier material and an oxygen scavenger; or (2) providing a first and second web; providing an optical data storage medium; forming a non-thermoformed pouch from the webs; placing the optical data storage medium in the pouch; and sealing the pouch; wherein at least one of the webs includes an oxygen barrier material, and at least one of the webs includes an oxygen scavenger.

11 Claims, 20 Drawing Sheets

U.S. PATENT DOCUMENTS

| | | |
|---|---|---|
| 2002/0162758 A1 | 11/2002 | Clemens |
| 2003/0213710 A1 | 11/2003 | Thompson et al. |
| 2004/0008613 A1 | 1/2004 | Beckwith et al. |
| 2004/0043254 A1 | 3/2004 | Wisnudel et al. |
| 2004/0152013 A1 | 8/2004 | Olson et al. |
| 2004/0185155 A1 | 9/2004 | Garwood |

FOREIGN PATENT DOCUMENTS

| | | |
|---|---|---|
| WO | WO 99/10251 | 3/1999 |
| WO | WO 99/54133 | 10/1999 |
| WO | WO 2004/007315 | 1/2004 |

OXYGEN SCAVENGING FORM/FILL/SEAL PACKAGE FOR LIMITED LIFETIME OPTICAL DATA STORAGE MEDIA

FIELD OF THE INVENTION

The present invention relates to packaging for limited lifetime optical data storage media.

BACKGROUND OF THE INVENTION

Optical data storage media such as CD's (Compact Discs), DVD's (Digital Video Discs or Digital Variety Discs), DVD-ROM, and CDROM's are used to distribute software, games, movies, and the like. Limited lifetime versions have been developed, e.g. by Flex-play Technologies, Inc. and Spectra-Disc, that are playable for a limited amount of time, e.g. between 15 and 48 hours. Examples of this technology are disclosed in U.S. Pat. No. 5,815,484 (Smith et al.), U.S. Pat. No. 6,338,933 (Lawandy et al.), U.S. Pat. No. 6,343,063 (Rollhaus et a U.S. Pat. No. 6,011,772 (Rollhaus et al.), all incorporated herein by reference in their entirety. These technologies would allow for example, point-of-purchase of movies that would not have to be returned, because after a limited time the disc will no longer play, i.e. become inactive.

One method to make limited lifetime discs is to incorporate a layer within them that contains a dye in a transparent reduced (leuco) form. Upon exposure to oxygen for a period of time, e.g. oxygen from air, the leuco dye oxidizes and becomes optically colored or darkened. This chemical reaction and resulting color change effectively blocks the interrogating laser beam used to read the data. This can be incorporated for example into various DVD formats including DVD-5, DVD-9, DVD-18 and the like. Other technologies achieve limited play life by incorporating chemistry that causes, in the presence of oxygen, the reflective metallic coating to oxidize or corrode. The oxidized or corroded metallic coating can not then accurately reflect the interrogating laser beam used to read the data.

A shelf life of between 6 and 12 months is highly desirable for such oxygen-sensitive optical discs. Unfortunately, even in a rigorously gas flushed and/or vacuum high barrier package sufficient oxygen is often present to activate the limited lifetime chemistry. The oxygen may be dissolved in the polycarbonate (PC) disc and/or trapped in the small headspace in the package. Because of the thickness and OTR (oxygen transmission rate) of typical optical discs, it requires about 24 hours to de-oxygenate the PC by inert gas flushing, which is an impractical packaging scenario. A failure to control and limit the presence of oxygen will result in premature disabling of the optical disc. While polycarbonate is currently the material of choice in the manufacture of optical discs, dissolved oxygen and oxygen diffusion issues would also be present to varying degrees in any other polymer that may be used to manufacture optical discs. Polymers that may be selected for optical disc manufacture include acrylic polymers and copolymers, polyamides, polymethylpentene, ethylene/norbornene copolymers, polyesters, and styrenic polymers.

In order to have reasonable shelf life through distribution, these limited lifetime discs can benefit greatly from oxygen scavenging packaging.

One form of oxygen scavenging packaging is oxygen scavenging sachets. These could be used in a MAP (modified atmosphere) package, but unfortunately can be costly, and aesthetically difficult to accommodate in a package containing a typically thin optical data storage medium such as a CD or DVD.

Another current package format is a primary vacuum or MAP (modified atmosphere) package in the form of a thermoformed package, that additionally incorporates an oxygen scavenger in either or both of a thermoformed (preferably bottom) web and a covering (preferably non-formed and preferably top) web. The packaging of the optical data storage medium is currently accomplished through the use of thermoforming packaging equipment such as a Tiromat Compact or Multivac R230. This package can prevent premature disabling or inactivation of an optical data storage medium before the intended lifetime of the medium is reached. If the package format is a vacuum package, an oxygen scavenger relatively uniformly dispersed in the film is advantageous over sachets and the like. This is because, in a tight vacuum package, a sachet tends to provide oxygen scavenging activity that is physically localized and therefore functionally limited to its position in the package. In contrast, an oxygen scavenging film which physically forms at least a portion of the primary packaging material, e.g. as a continuous or semi-continuous layer or coating, will effectively scavenge oxygen in whatever portion of the package the scavenger is present. A thermoformed package can incorporate an oxygen scavenger in the form of a layer or coating, preferably along with at least one of several other useful features. These include means for opening the package, a means for identifying the package (authentication), an anti-theft feature, a means of tracking and/or inventory management, and printing (graphics).

Unfortunately, the thermoform packaging of limited lifetime optical data storage media is relatively slow, causing increased packaging costs, and requiring the use of a relatively expensive forming web to form a "pocket" in which the product is inserted. Also, the optical data storage medium is loaded into a shallow thermoformed pocket from which it can become dislodged and enter the sealing areas of the forming web.

The described invention utilizes form/fill/seal type equipment and methodologies to form pouches containing the products. Such equipment is available from Klockner, Hayssen, Ilapack and others. Form/fill/seal technologies allow the securing of the optical data storage medium by such methods as small adhesive strips, static charge, steam (moisture adhesion) etc.

SUMMARY OF THE INVENTION

In a first aspect, a package comprises a non-thermoformed thermoplastic pouch comprising a first panel and a second panel; and an optical data storage medium disposed in the pouch; wherein the pouch comprises an oxygen barrier material, and an oxygen scavenger. The pouch can be made from layflat thermoplastic film. The pouch can be sealed.

In a second aspect, a method of making a package comprises providing a thermoplastic web; providing an optical data storage medium; forming a non-thermoformed pouch from the thermoplastic web, the pouch comprising a first panel and a second panel; placing the optical data storage medium in the pouch; and sealing the pouch; wherein the web comprises an oxygen barrier material and comprises an oxygen scavenger.

In a third aspect, a method of making a package comprises providing a first thermoplastic web; providing a second thermoplastic web; providing an optical data storage medium; forming a non-thermoformed pouch from the first and second thermoplastic web; placing the optical data storage medium in the pouch; and sealing the pouch; wherein at least one of the first and second webs comprises an oxygen barrier material, and at least one of the first and second web comprises an oxygen scavenger.

In these second and third aspects, between the step of placing the optical data storage medium in the pouch, and the step of sealing the pouch, the pouch can optionally be vacuumized, gas flushed, vacuumized and then gas flushed, or vacuumized, gas flushed, and revacuumized, or any combination of these steps, and/or compressed or mechanically squeezed, e.g. by rolling the pouch with a roller, pressing the pouch with a pad or other device, etc. to expel excess air or modified atmosphere from the interior of the pouch. The mechanical squeezing action can be performed by the use of a foam rubber platen that is actuated at any suitable time, e.g. immediately prior to making the transverse seals, or immediately prior to making the final transverse seal. For example, the optical data storage medium can be inserted in a pouch, and the filled pouch can be pressed, e.g. by rolling the pouch with a roller, or compressed with a pad, to expel excess air or modified atmosphere from the interior of the pouch. In this particular example, no vacuumization or gas flush of the pouch is performed. An alternative process includes, between the step of placing the optical data storage medium in the pouch, and the step of sealing the pouch, the steps of gas purging the pouch, followed by compressing or mechanically squeezing the pouch In the aspect of forming a non-thermoformed pouch from the first and second thermoplastic web, these webs can be sealed such that these webs are in congruent relationship along a perimeter of the final package, and a perimeter seal joins the first and second thermoplastic webs along at least a portion of the perimeter of the package.

BRIEF DESCRIPTION OF THE DRAWINGS

A detailed description of preferred embodiments of the invention follows, with reference to the attached drawings, wherein.

DEFINITIONS

Figure 1:
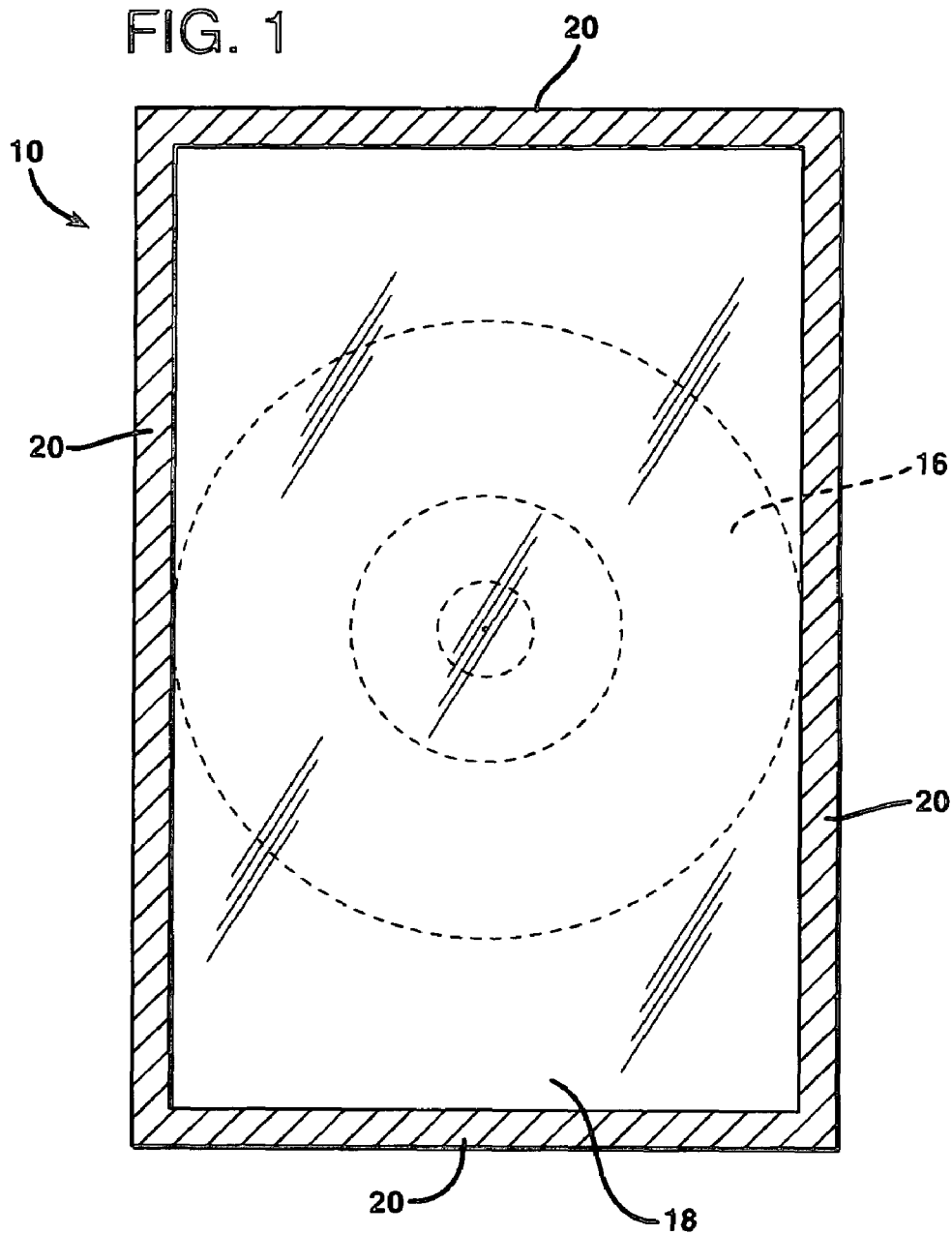
FIG. 1 is a plan view of a first embodiment of a package in accordance with the invention.

Although the present invention and its associated methodology may be described with respect to a single type of optical storage media, the ordinarily skilled artisan will readily appreciate that these teachings may also be applied to other types of limited-lifetime optical storage media.

"Electronic article surveillance" and "EAS" herein refers to commercially available systems for inhibiting the theft of goods from retail stores using an active tag associated with each article, which triggers an alarm when entering an interrogation zone at the store exit. The EAS tag reacts to signals transmitted by EAS security devices positioned at the exits of the store. Upon being interrogated by a specific signal, the EAS tag is adapted to emit a signal that is detectable by an EAS receiver, which can then activate an alarm. The preferred anti-theft device is integral to the primary package, increasing the security of the overall package. There are several types of EAS systems presently in use including RF, microwave, harmonic, and acousto-magnetic or magnetomechanical techniques for spatial magnetic interrogation and novel tags. EAS technology is disclosed e.g. in U.S. Pat. No. 5,744,791 (Isaac et al.), U.S. Pat. No. 5,859,587 (Alicot et al.), U.S. Pat. No. 5,884,425 (Baldwin), all incor by reference herein in their entirety. The technology described in WO 96/31790, sometimes referred to as "Flying Null" technology, is based on exploiting the behavior of magnetic materials as they pass through a region of space containing a magnetic null. Passive tags containing one or more magnetic elements can perform as remotely-readable data carriers, the number and spatial arrangement of the elements representing information such as a unique package identifier.

"Ethylene/alpha-olefin copolymer" (EAO) herein refers to copolymers of ethylene with one or more comonomers selected from $C_4$ to $C_{10}$ alpha-olefins such as butene-1, hexene-1, octene-1, etc. in which the molecules of the copolymers comprise long polymer chains with relatively few side chain branches arising from the alpha-olefin which was reacted with ethylene. This molecular structure is to be contrasted with conventional high pressure low or medium density polyethylenes which are highly branched with respect to EAOs and which high pressure polyethylenes contain both long chain and short chain branches. EAO includes such heterogeneous materials as linear medium density polyethylene (LMDPE), linear low density polyethylene (LLDPE), and very low and ultra low density polyethylene (VLDPE and ULDPE), such as DOWLEX™ or ATTANE™ resins supplied by Dow, ESCORENE™ or EXCEED™ resins supplied by Exxon; as well as linear homogeneous ethylene/alpha olefin copolymers (HEAO) such as TAFMER™ resins supplied by Mitsui Petrochemical Corporation, EXACT™ resins supplied by Exxon, or long chain branched (HEAO) AFFINITY™ resins supplied by the Dow Chemical Company, or ENGAGE™ resins supplied by DuPont Dow Elastomers.

"Ethylene homopolymer or copolymer" herein refers to ethylene homopolymer such as low density polyethylene; ethylene/alpha olefin copolymer such as those defined herein; ethylene/vinyl acetate copolymer; ethylene/alkyl acrylate copolymer; ethylene/(meth)acrylic acid copolymer; or ionomer resin.

"EVOH" herein refers to the saponified product of ethylene/vinyl ester copolymer, generally of ethylene/vinyl acetate copolymer, wherein the ethylene content is typically between 20 and 60 mole % of the copolymer, and the degree of saponification is generally higher than 85%, preferably higher than 95%.

"Gas flushing" herein refers to its ordinary industry definition, and associated with a vacuumization step.

"Gas purging" herein refers to a process synonymous with gas flushing, but not associated with a vacuumization step.

"High density polyethylene" (HDPE) herein refers to a polyethylene having a density of between 0.94 and 0.965 grams per cubic centimeter.

"Linear low density polyethylene" (LLDPE) herein refers to polyethylene having a density between 0.917 and 0.925 grams per cubic centimeter.

"Linear medium density polyethylene" (LMDPE) herein refers to polyethylene having a density between 0.926 grams per cubic centimeter and 0.939 grams per cubic centimeter.

"Non-thermoformed" herein refers to the state of a web that has not been subjected to a thermoforming operation. This web will typically be a flat film prior to its manipulation into a pouch.

"Oxygen barrier" herein refers to polymeric or metallic materials with low oxygen transmission rates, i.e. with high barrier to oxygen. It is preferred that the oxygen permeability of the barrier, in the absence of the oxygen scavenger, be less than 500 cubic centimeters of oxygen/square meter•day•atmosphere ($cm^3O_2/m^2$•d•atm.) tested at 1 mil thick, at 25° C., at 0% relative humidity, according to ASTM D3985, and more preferably less than 100, more preferably less than 50 and most preferably less than 25 $cm^3O_2/m^2$•d•atm., such as less than 10, less than 5, and less than 1 $cm^3O_2/m^2$•d•atm. Examples of polymeric materials with low oxygen transmission rates are ethylene/vinyl alcohol copolymer (EVOH), polyvinylidene dichloride (PVDC), vinylidene chloride copolymer such as vinylidene chloride/methyl acrylate copolymer, polyamide, polyester, polyacrylonitrile (available as Barex™ resin), or blends thereof. Oxygen barrier materials may further comprise high aspect ratio fillers that create a tortuous path for permeation (e.g., nanocomposites). The oxygen barrier of materials may be further enhanced by the incorporation of an oxygen scavenger. Alternatively, metal foil, metallized substrates (e.g. metallized polyethylene terephthalate (PET), metallized polyamide, or metallized polypropylene), or coatings comprising SiOx or AlOx compounds can be used to provide low oxygen transmission to the package.

"Oxygen scavenger", and the like herein means a composition, compound, continuous or discontinuous film layer, coating, or the like, which can consume, deplete or react with oxygen from a given environment. "Oxygen scavenger" herein includes those scavengers disclosed in U.S. Pat. No. 5,350,622, and a method of initiating oxygen scavenging generally is disclosed in U.S. Pat. No. 5,211,875. Both patents are incorporated herein by reference in their entirety. According to U.S. Pat. No. 5,350,622, oxygen scavengers are made of an ethylenically unsaturated hydrocarbon and transition metal catalyst. The preferred ethylenically unsaturated hydrocarbon may be either substituted or unsubstituted. As defined herein, an unsubstituted ethylenically unsaturated hydrocarbon is any compound that possesses at least one aliphatic carbon-carbon double bond and comprises 100% by weight carbon and hydrogen. A substituted ethylenically unsaturated hydrocarbon is defined herein as an ethylenically unsaturated hydrocarbon which possesses at least one aliphatic carbon-carbon double bond and comprises about 50%-99% by weight carbon and hydrogen. Preferable substituted or unsubstituted ethylenically unsaturated hydrocarbons are those having two or more ethylenically unsaturated groups per molecule. More preferably, it is a polymeric compound having three or more ethylenically unsaturated groups and a molecular weight equal to or greater than 1,000 weight average molecular weight. Examples of unsubstituted ethylenically unsaturated hydrocarbons include, but are not limited to, diene polymers such as polyisoprene, (e.g., transpolyisoprene) and copolymers thereof, cis and trans 1,4-polybutadiene, 1,2-polybutadienes, (which are defined as those polybutadienes possessing greater than or equal to 50% 1,2 microstructure), and copolymers thereof, such as styrene-butadiene copolymer. Such hydrocarbons also include polymeric compounds such as polypentenamer, polyoctenamer, and other polymers prepared by cyclic olefin metathesis; diene oligomers such as squalene; and polymers or copolymers with unsaturation derived from dicyclopentadiene, norbornadiene, 5-ethylidene-2-norbornene, 5-vinyl-2-norbornene, 4-vinylcyclohexene, 1,7-octadiene, or other monomers containing more than one carbon-carbon double bond (conjugated or non-conjugated). Examples of substituted ethylenically unsaturated hydrocarbons include, but are not limited to, those with oxygen-containing moieties, such as esters, carboxylic acids, aldehydes, ethers, ketones, alcohols, peroxides, and/or hydroperoxides. Specific examples of such hydrocarbons include, but are not limited to, condensation polymers such as polyesters derived from monomers containing carbon-carbon double bonds, and unsaturated fatty acids such as oleic, ricinoleic, dehydrated ricinoleic, and linoleic acids and derivatives thereof, e.g. esters. Such hydrocarbons also include polymers or copolymers derived from (meth)allyl (meth)acrylates. Suitable oxygen scavenging polymers can be made by trans-esterification. Such polymers are disclosed in U.S. Pat. No. 5,859,145 (Ching et al.) (Chevron Research and Technology Company), incorporated herein by reference as if set forth in full. The composition used may also comprise a mixture of two or more of the substituted or unsubstituted ethylenically unsaturated hydrocarbons described above. While a weight average molecular weight of 1,000 or more is preferred, an ethylenically unsaturated hydrocarbon having a lower molecular weight is usable, especially if it is blended with a film-forming polymer or blend of polymers. Ethylenically unsaturated hydrocarbons which are appropriate for forming solid transparent layers at room temperature are preferred for scavenging oxygen in the package as described herein. For most applications where transparency is necessary, a layer which allows at least 50% transmission of visible light is preferred. When making transparent oxygen-scavenging layers, 1,2-polybutadiene is useful at room temperature. For instance, 1,2-polybutadiene can exhibit transparency, mechanical properties and processing characteristics similar to those of polyethylene. In addition, this polymer is found to retain its transparency and mechanical integrity even after most or all of its oxygen uptake capacity has been consumed, and even when little or no diluent resin is present. Even further, 1,2-polybutadiene exhibits a relatively high oxygen uptake capacity and, once it has begun to scavenge, it exhibits a relatively high scavenging rate as well. When oxygen scavenging at low temperatures is desired, 1,4-polybutadiene, and copolymers of styrene with butadiene, and styrene with isoprene are useful. Such compositions are disclosed in U.S. Pat. No. 5,310,497 issued to Speer et al. on May 10, 1994 and incorporated herein by reference as if set forth in full. In many cases, it may be desirable to blend the aforementioned polymers with a polymer or copolymer of ethylene. Other oxygen scavengers which can be used in connection with this invention are disclosed in U.S. Pat. No. 5,958,254 (Rooney), incorporated by reference herein in its entirety. These oxygen scavengers include at least one reducible organic compound which is reduced under predetermined conditions, the reduced form of the compound being oxidizable by molecular oxygen, wherein the reduction and/or subsequent oxidation of the organic compound occurs independent of the presence of a transition metal catalyst. The reducible organic compound is preferably a quinone, a photoreducible dye, or a carbonyl compound which has absorbence in the UV spectrum.

An additional example of oxygen scavengers which can be used in connection with this invention are disclosed in PCT patent publication WO 99/48963 (Chevron Chemical et al.). These oxygen scavengers include a polymer or oligomer having at least one cyclohexene group or functionality. These oxygen scavengers include a polymer having a polymeric backbone, cyclic olefinic pendent group, and linking group linking the olefinic pendent group to the polymeric backbone.

An oxygen scavenging composition suitable for use with the invention comprises:

(a) a polymer or lower molecular weight material containing substituted cyclohexene functionality according to the following diagram:

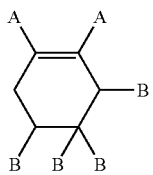

where A may be hydrogen or methyl and either one or two of the B groups is a heteroatom-containing linkage which attaches the cyclohexene ring to the said material, and wherein the remaining B groups are hydrogen or methyl;

(b) a transition metal catalyst; and optionally (c) a photoinitiator.

An additional example of oxygen scavengers which can be used in connection with this invention are disclosed in U.S. patent Nos. U.S. Pat. No. 6,254,803 (Matthews et al.) and U.S. Pat. No. 6,254,804 (Matthews et al.) directed to polyester and EMCM-type compositions capable of scavenging oxygen, and both incorporated herein by reference in their entirety. The Matthews et al. '03 patent claims a composition comprising a polymer or oligomer having at least one cyclohexene group, and a transition metal salt, compound, or complex, wherein the polymer or oligomer is prepared from the reaction of a tetrahydrophthalic anhydride with at least one of a diol, a hydroxy compound, or a polyhydroxy compound. The Matthews et al. '04 patent claims a composition comprising a polymer or oligomer having at least one cyclohexene group, and a transition metal salt, compound, or complex, wherein the polymer or oligomer is prepared from the reaction of a tetrahydrobenzyl alcohol with one or more compounds having an ester functionality.

Other oxygen scavengers which can be beneficially used in connection with the invention include a condensation polymer of metaxylylenediamine and adipic acid, such as those disclosed in U.S. Pat. Nos. 5,021,515 and 5,049,624, oxygen scavenging polyester, such as those disclosed in U.S. Pat. No. 6,083,585, and oxygen scavenging polyamides, such as those disclosed in U.S. Pat. No. 6,610,234, all incorporated herein by reference in their entirety; and ascorbate; isoascorbate; sulfite; ascorbate and a transition metal catalyst, the catalyst comprising a simple metal or salt, or a compound, complex or chelate of the transition metal; a transition metal complex or chelate of a polycarboxylic acid, salicylic acid, or polyamine; tannin; or reduced metal such as iron.

The compositions may be polymeric in nature or they may be lower molecular weight materials. In either case they may be blended with further polymers or other additives. In the case of low molecular weight materials they will most likely be compounded with a carrier resin before use. When used in forming a package, the oxygen scavenging composition can include only the above-described polymers and a transition metal catalyst.

However, photoinitiators can be added to further facilitate and control the initiation of oxygen scavenging properties. Adding a photoinitiator or a blend of photoinitiators to the oxygen scavenging composition can be preferred, especially where antioxidants have been added to prevent premature oxidation of the composition during processing and storage. Suitable photoinitiators are known to those skilled in the art. See, e.g., PCT publication WO 97/07161, WO 97/44364, WO 98/51758, and WO 98/51759. Specific examples of suitable photoinitiators include, but are not limited to, benzophenone, and its derivatives, such as methoxybenzophenone, dimethoxybenzophenone, dimethylbenzophenone, 4-phenylbenzopenone, diphenoxybenzophenone, allyloxybenzophenone, diallyloxybenzophenone, dodecyloxybenzophenone, dibenzosuberone, 4,4'-bis(4-isopropylphenoxy) benzophenone, 4-morpholinobenzophenone, 4-aminobenzophenone, tribenzoyl triphenylbenzene, tritoluoyl triphenylbenzene, 4,4'-bis(dimethylamino)benzophenone, acetophenone and its derivatives, such as, o-methoxyacetophenone, 4'-methoxyacetophenone, valerophenone, hexanophenone, α-phenyl-butyrophenone, p-morpholinopropiophenone, benzoin and its derivatives, such as, benzoin methyl ether, benzoin butyl ether, benzoin tetrahydropyranyl ether, 4-o-morpholinodeoxybenzoin, substituted and unsubstituted anthraquinones, α-tetralone, acenaphthenequinone, 9-acetylphenanthrene, 2-acetyl-phenanthrene, 10-thioxanthenone, 3-acetyl-phenanthrene, 3-acetylindole, 9-fluorenone, 1-indanone, 1,3,5-triacetylbenzene, thioxanthen-9- one, isopropylthioxanthen-9-one, xanthene-9-one, 7-H-benz[de]anthracen-7-one, 1'-acetonaphthone, 2'-acetonaphthone, acetonaphthone, benz[a]anthracene-7,12-dione, 2,2-dimethoxy-2-phenylacetophenone, α,α-diethoxyacetophenone, α,α-dibutoxyacetophenone, 4-benzoyl-4'-methyl (diphenyl sulfide) and the like. Single oxygen-generating photosensitizers such as Rose Bengal, methylene blue, and tetraphenylporphine as well as polymeric initiators such as poly(ethylene carbon monoxide) and oligo[2-hydroxy-2-methyl-1-[4-(1-methylvinyl)phenyl]propanone] also can be used. However, photoinitiators are preferred because they generally provide faster and more efficient initiation. When actinic radiation is used, photoinitiators also can provide initiation at longer wavelengths, which are less costly to generate and present less harmful side effects than shorter wavelengths. When a photoinitiator is present, it can enhance and/or facilitate the initiation of oxygen scavenging by the composition of the present invention upon exposure to radiation. The amount of photoinitiator can depend on the amount and type of cyclic unsaturation present in the polymer, the wavelength and intensity of radiation used, the nature and amount of antioxidants used, and the type of photoinitiator used. The amount of photoinitiator also can depend on how the scavenging composition is used. For instance, if a photoinitiator-containing composition is in a film layer, which underneath another layer is somewhat opaque to the radiation used, more initiator might be needed. However, the amount of photoinitiator used for most applications ranges from about 0.01 to about 10% (by wt.) of the total composition. Oxygen scavenging can be initiated by exposing an article containing the composition of the present invention to actinic or electron beam radiation. Also suitable for use in the present invention is the oxygen scavenger of U.S. Pat. No. 6,255,248 (Bansleben et al.), issued Jul. 3, 2001, incorporated herein by reference in its entirety, which discloses a copolymer of ethylene and a strained, cyclic alkylene, preferably cyclopentene, and a transition metal catalyst. Another oxygen scavenger which can be used in connection with this invention is the oxygen scavenger of U.S. Pat. No. 6,214,254 (Gauthier et al.) issued Apr. 10, 2001, incorporated herein by reference in its entirety, which discloses ethylene/vinyl aralkyl copolymer and a transition metal catalyst. As indicated above, the oxygen scavenging hydrocarbon is combined with a transition metal catalyst. Suitable metal catalysts are those which can readily interconvert between at least two oxidation states. Preferably, the catalyst is in the form of a transition metal salt, with the metal selected from the first, second or third transition series of the Periodic Table. Suitable metals include, but are not limited to, manganese II or III, iron II or III, cobalt II or III, nickel II or III, copper I or II, rhodium II, III or IV, and ruthenium II or III. The oxidation state of the metal when introduced is not necessarily that of the active form. The metal is preferably iron, nickel or copper, more preferably manganese and most preferably cobalt. Suitable counterions for the metal include, but are not limited to, chloride, acetate, stearate, palmitate, caprylate, linoleate, tallate, 2-ethylhexanoate, neodecanoate, oleate or naphthenate. Particularly preferable salts include cobalt (II) 2-ethylhexanoate, cobalt stearate, and cobalt (II) neodecanoate. The metal salt may also be an ionomer, in which case a polymeric counterion is employed. Such ionomers are well known in the art. Any of the above-mentioned oxygen scavengers and transition metal catalyst can be further combined with one or more polymeric diluents, such as thermoplastic polymers which are typically used to form film layers in plastic packaging articles. In the manufacture of certain packaging articles well known thermosets can also be used as the polymeric diluent. Polymers which can be used as the diluent include, but are not limited to, polyethylene terephthalate (PET), polyethylene, low or very low density polyethylene, ultra-low density polyethylene, linear low density polyethylene, polypropylene, polyvinyl chloride, polystyrene, and ethylene copolymers such as ethylene-vinyl acetate, ethylene-alkyl (meth)acrylates, ethylene-(meth)acrylic acid and ethylene-(meth)acrylic acid ionomers. Blends of different diluents may also be used. However, the selection of the polymeric diluent largely depends on the article to be manufactured and the end use. Such selection factors are well known in the art. Further additives can also be included in the composition to impart properties desired for the particular article being manufactured. Such additives include, but are not necessarily limited to, fillers, pigments, dyestuffs, antioxidants, stabilizers, processing aids, plasticizers, fire retardants, anti-fog agents, odor absorbants such as cyclodextrin, zeolites, amorphous silica, etc, COF adjusting agents such as erucamide, oleamide waxes, and high molecular weight polymethylsiloxane, and antiblocking agents such as talc, amorphous and crystalline silica, diatomaceous earth, calcium carbonate, etc. The mixing of the components listed above is preferably accomplished by melt blending at a temperature in the range of 50° C. to 300° C. However, alternatives such as the use of a solvent followed by evaporation may also be employed. The blending may immediately precede the formation of the finished article or preform or precede the formation of a feedstock or masterbatch for later use in the production of finished packaging articles. Preferred oxygen scavengers include OS Films™ available from Cryovac, Inc., as well as $ZERO_2$ ™ technology available from CSIRO (Commonwealth Scientific and Industrial Research Organization).

"Plastic reclosable fastener" herein refers to articles such as pressure sensitive adhesive strips or tapes of a type well known in the art. "Plastic reclosable fastener" herein also refers to "zippers" have male and female fastener elements in the form of reclosable interlocking rib and groove elements that permit the package to be opened, closed, and reopened, i.e. provide reclosability. Two popular types of zippers are the "pinch" zipper, in which the male and female components are pressed together manually to close the zipper, and the "slide" zipper, in which a typically semi-rigid slider is installed on the zipper, and is run transversely along the length of the zipper to close the zipper. Examples of the pinch zipper are disclosed in U.S. Pat. No. 5,059,036 (Richison et al.), U.S. Pat. No. 5,147,272 (Richison et al.), and U.S. Pat. No. 5,147,272 (Richison et al.) all incorporated herein by reference in their entirety. An example of the slide zipper is U.S. Pat. No. 5,007,143 (Herrington), incorporated herein by reference in its entirety. A typical zipper is one which has a groove or other indentation installed on the surface of a first member, and a rib or other protrusion on the surface of a second member, which rib or other protrusion can interlock into the groove or other indentation when the first and second members are pressed together. Alternatively, a first member having a plurality of grooves or other indentations installed on the surface thereof, and a second member having a plurality of ribs or other protrusions, can interlock when the first and second members are pressed together. In this alternative case, there may be no substantial difference in appearance between the two members, as the ribs may simply be the intervals between grooves on a strip which may lock into another of the same kind. More generally, some form of male/female interengagement is used to join two surfaces together. The interlocking members will typically be manufactured such that a flange is present around the border of the members. This flange essentially carries the interlocking portions of the overall zipper, and facilitates attachment by heat sealing, gluing, or other means of adhesion to the package of which the zipper forms the closure feature. Zippers are commercially available that are coated with a coating to enhance or inhibit adhesion of the zipper to selected materials with which the zipper will be associated. Those skilled in the art will be acquainted with reclosable plastic zipper technology.

"Polyamide" herein refers to polymers having amide linkages along the molecular chain, and preferably to synthetic polyamides such as nylons. Furthermore, such term encompasses both polymers comprising repeating units derived from monomers, such as caprolactam, which polymerize to form a polyamide, as well as polymers of diamines and diacids, and copolymers of two or more amide monomers, including nylon terpolymers, sometimes referred to in the art as "copolyamides". "Polyamide" specifically includes those aliphatic polyamides or copolyamides commonly referred to as e.g. polyamide 6 (homopolymer based on $\epsilon$-caprolactam), polyamide 6,9 (homopolycondensate based on hexamethylene diamine and azelaic acid), polyamide 6,10 (homopolycondensate based on hexamethylene diamine and sebacic acid), polyamide 6,12 (homopolycondensate based on hexamethylene diamine and dodecandioic acid), polyamide 11 (homopolymer based on 11-aminoundecanoic acid), polyamide 12 (homopolymer based on $\omega$-aminododecanoic acid or on laurolactam), polyamide 6/12 (polyamide copolymer based on $\epsilon$-caprolactam and laurolactam), polyamide 6/6,6 (polyamide copolymer based on $\epsilon$-caprolactam and hexamethylenediamine and adipic acid), polyamide 6,6/6,10 (polyamide copolymers based on hexamethylenediamine, adipic acid and sebacic acid), modifications thereof and blends thereof. Said term also includes crystalline or partially crystalline, or amorphous, aromatic or partially aromatic, polyamides. Examples of partially crystalline aromatic polyamides include meta-xylylene adipamide (MXD6), copolymers such as MXD6/MXDI, and the like. Examples of amorphous, semi-aromatic polyamides nonexclusively include poly(hexamethylene isophthalamide-co-terephthalamide) (PA-6,I/6T), poly(hexamethylene isophthalamide) (PA-6,I), and other polyamides abbreviated as PA-MXDI, PA-6/MXDT/I, PA-6,6/6I and the like.

"Polyester" herein refers to a thermoplastic polymer in which the main polymer backbones are formed by the esterification condensation of polyfunctional alcohols and acids. Copolyesters are included. An example of a polyester is polyethylene terephthalate.

"Polymer" herein refers to homopolymer, copolymer, terpolymer, etc. "Copolymer" herein includes copolymer, terpolymer, etc. "PVDC" herein refers to any vinylidene chloride copolymer wherein a major amount of the copolymer comprises vinylidene chloride and a minor amount of the copolymer comprises one or more unsaturated monomers copolymerizable therewith, typically vinyl chloride, and alkyl acrylates or methacrylates (e.g. methyl acrylate or methyl methacrylate) and the blends thereof in different proportions. Generally, a PVDC barrier layer will contain plasticizers and/or stabilizers as known in the art.

"Radio Frequency Identification Device" and "RFID" herein refer to technology that uses electromagnetic energy as a medium through which to send information. An RFID device is used for electronic identification and/or authentication. The RFID contains a microchip with a unique identification number and specialized micro-electronic circuitry (a transponder) for communicating this unique number to an RFID reader. The RFID is called a passive communication device because it does not contain a battery. Rather, it uses electromagnetic energy received from the RFID reader to power the transponder and send a radio signal containing the unique identification number back to the reader. This number can then be fed directly to a computer for recording. Typically, RFID tags are devices which are affixed to various articles so that these articles may be easily tracked during movement from one point to another or identified through a sales transaction. Therefore, one may tag objects so that they may be identified or tracked automatically via a reader which is frequently connected to a host computer that may contain additional data related to an object's identification number which is associated with the RFID tag. Furthermore, the RFID tag generally contains programmed information about an object to which it is attached. Through the use of such information, RFID technology may be used to identify objects automatically and without manual handling operations as is required in most bar code systems.

"Trigger" and the like refers herein to that process defined in U.S. Pat. No. 5,211,875, whereby oxygen scavenging is initiated by exposing a web, composition, film, etc. to actinic radiation having a wavelength of less than about 750 nm at an intensity of at least about 1.6 mW/cm$^2$ or an electron beam at a dose of at least about 0.2 megarads, wherein after initiation the oxygen scavenging rate is at least about 0.05 cc oxygen per day per gram of oxidizable organic compound for at least two days after oxygen scavenging is initiated. Preferred is a method offering a short "induction period" (the time that elapses, after exposing the oxygen scavenger to a source of actinic radiation, before initiation of the oxygen scavenging activity begins) so that the oxygen scavenger can be activated at or immediately prior to use during filling and sealing of the package with an oxygen sensitive material; a method wherein the oxygen scavenging material is substantially consistently triggered across the entire internal surface of the pre-formed package; a method which is simple and readily incorporated into existing packaging procedures; and a method which is readily incorporated in-line into existing packaging systems. Thus, "trigger" refers to exposing a composition or article to actinic radiation as described above; "initiation" refers to the point in time at which oxygen scavenging actually begins; and "induction time" refers to the length of time, if any, between triggering and initiation.

"Web" herein means a film, laminate, sheet, web, coating, or the like which can be used to package an optical data storage medium.

Any compositional percentages used herein are presented on a "by weight" basis, unless designated otherwise.

DETAILED DESCRIPTION OF THE INVENTION

Two Web Embodiments

Figure 2:
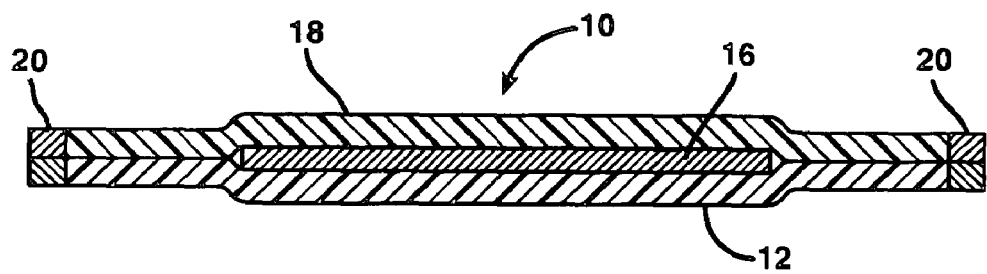
FIG. 2 is a side elevational view (not to scale) of the package of FIG. 1.

A first embodiment in accordance with the present invention is shown in FIGS. 1 and 2. A primary package 10 includes a non-thermoformed, lay flat web 12, an optical data storage medium 16, such as a compact disc or DVD, and a second non-thermoformed, lay flat web 18. The two webs can be in congruent relationship to one another, and contain or "sandwich" the optical data storage medium. The two webs are attached to one another at their respective perimeters by means of a perimeter heat seal 20. In the two web embodiment of the invention, as shown e.g. in FIG. 1, the two webs 12 and 18 can be considered as the first and second panels respectively of the final pouch. In single web embodiments of the invention, as disclosed further herein, the final pouch will have two major walls, forming the front and back respectively of the package, and these two walls can be considered as the first and second panels respectively of the final pouch.

Heat sealing can be accomplished by any suitable means well known in the art, e.g. by impulse or continuous heat sealing bars, RF sealing, and the like. Other forms of sealing can be used as appropriate, including pressure sensitive adhesives, or ultrasonic sealing.

It should be noted herein that web 12 is depicted in the drawings as a "bottom" web (see FIG. 2), i.e. in normal usage, the optical data storage medium will rest on the web 12 such that the web 12 comprises the bottom of the package. Likewise, web 18 is depicted in the drawings as a "top" web, i.e. in normal usage, the package will be positioned such that the web 18 comprises the top of the package. This description is for convenience in understanding the invention. Nevertheless, those skilled in the art will understand, after a review of the invention, that the package can be manufactured, stored, shipped, and/or displayed in any suitable orientation, so that for example the optical data storage medium can be placed on web 18 during production of the package, and the other web can function as the "bottom" of the package.

The webs can be made from any appropriate polymeric material, and preferably comprise olefinic polymers or copolymers, especially ethylene polymers or copolymers, such as ethylene/alpha-olefin copolymers. These webs can be of monolayer construction, but are preferably of multilayer construction. Either or both of the webs includes an oxygen barrier material, either as an extruded layer or a coating, The thickness and composition of the oxygen barrier layer will be suitably selected in order to provide the overall structure with an oxygen transmission rate (evaluated by ASTM D3985) of preferably less than 500 cubic centimeters of oxygen/square meter•day•atmosphere ($cm^3O_2/m^2$•d•atm) tested at 1 mil thick, at 25° C., at 0% relative humidity, preferably less than 150 $cm^3O_2/m^2$•d•atm. at room temperature and 0% relative humidity, more preferably less than 100, and even more preferably less than 50 $cm^3O_2/m^2$•d•atm., such as less than 25, less than 15, less than 5, and less than 1 $cm^3O_2/m^2$•d•atm.

Other layers can be present in either or both webs. Said additional layers can serve the purpose of providing the necessary bulk to the webs, or improving their mechanical properties, i.e. increased puncture resistance, increased abuse resistance, etc., or to better tie the various layers one to the other.

The two webs can have the same construction, or alternatively can differ in any suitable respect, such as number of layers, composition of layers, layer thicknesses, overall web thickness, etc.

At least one of the webs includes an oxygen scavenger, e.g. in the form of a coating or a discrete layer. Typically, optical data storage media, e.g. DVD-5, contain within them one or more metalized layers that is an effective oxygen barrier from one side of the disc. The active face of the disc, i.e. the side that is interrogated by a laser when the disc is played, beneficially faces the web having the oxygen scavenger (where only one web includes the oxygen scavenger).

In one embodiment, the package is a vacuumized package. Vacuum packages are in general well known in the art, including the steps of making such packages. In one such process which can be used to make the package of FIGS. 1 and 2, a first, non-thermoformable web and a second non-thermoformed web are brought together, and an optical data storage medium is placed, by e.g. manual or mechanical means, into the space between the two webs. The first and second web are beneficially in a congruent relationship so as to define a package with mating edges. The optical data storage medium is thereby covered. As this step takes place, and/or thereafter, a vacuum is drawn from the interior of the package. The package is perimeter sealed and individual packages are produced by transverse cuts in the respective webs to produce discrete packages. Vacuumizing and web handling equipment are commercially available. After the initial vacuum step, and before and/or during sealing, the package can optionally be gas flushed with an inert gas or gas mixture, such as nitrogen, carbon dioxide, or a nitrogen/carbon dioxide mixture, and then revacuumized. In vacuum packages, it may be desirable to include one or more channels that radiate from the main pocket (see FIG. 13). These would provide additional stiffness to the package and in cases where only one web scavenges, would expose more surface area of the scavenging web allowing more rapid oxygen depletion.

Alternatively, a MAP package, and especially a MAP package with a low headspace, can be made. If a MAP package is used, additional heat-seal regions can optionally be used to hold the disc stationary in the package (see FIG. 11). MAP packages can be produced essentially as described herein with respect to vacuum packages, but only a vacuum step and the subsequent gas flush step are implemented, without a revacuumization of the package.

Alternatively, the package can be gas purged without an initial vacuumization step.

Alternatively, the package can be gas flushed followed by a vacuumization step. "Gas purge" and "gas flush" can be in the form of a gas, or in the form of a liquid that becomes a gas.

Alternatively, the package of the invention can be made without either a vacuum or gas flush step, although in this embodiment it may be more difficult to insure that oxygen in the package does not result in premature inactivation of the limited lifetime optical data storage medium.

Webs of the present invention can have any total thickness desired, so long as the webs provide the desired properties for the particular packaging operation in which the web is used. Final web thicknesses can vary, depending on process, end use application, etc. Typical thicknesses range between 0.1 to 20 mils, preferably between 0.3 and 15 mils, more preferably 0.5 to 10 mils, more preferably 1 to 8 mils, more preferably 3 to 6 mils, such as 4 to 5 mils. Where a pouch is constructed from a single web, e.g. in a centerfolded, HFFS, or VFFS pouch making process, the two panels that will be typically formed will of course have the same thickness. Where two discrete webs are used to form the pouch, these will beneficially have the same thickness, although the two webs can have distinct thicknesses. Webs of the present invention can be made by any suitable process, including coextrusion, lamination, and extrusion coating, and are preferably made by tubular cast coextrusion, flat cast coextrusion, or by a hot blown coextrusion process. Films can be optionally stretch oriented, but are preferably not stretch oriented.

The primary package can be used as is to store optical data storage media. Alternatively, the primary package can be inserted in, and optionally adhered to, a paperboard sleeve or envelope, or inserted into the pocket of a booklet (see FIG. 3). The outer surface layers of the primary package are preferably compatible with various types of adhesives in order to form an integral package with the paperboard envelope. Additionally, if the paperboard forms a book-like package, it may be desirable to have the primary plastic package extend throughout the paper to provide tear resistance. If the paperboard is easily torn, it may be possible for a thief to separate the RFID or EAS tag from the primary plastic package.

Figure 3:
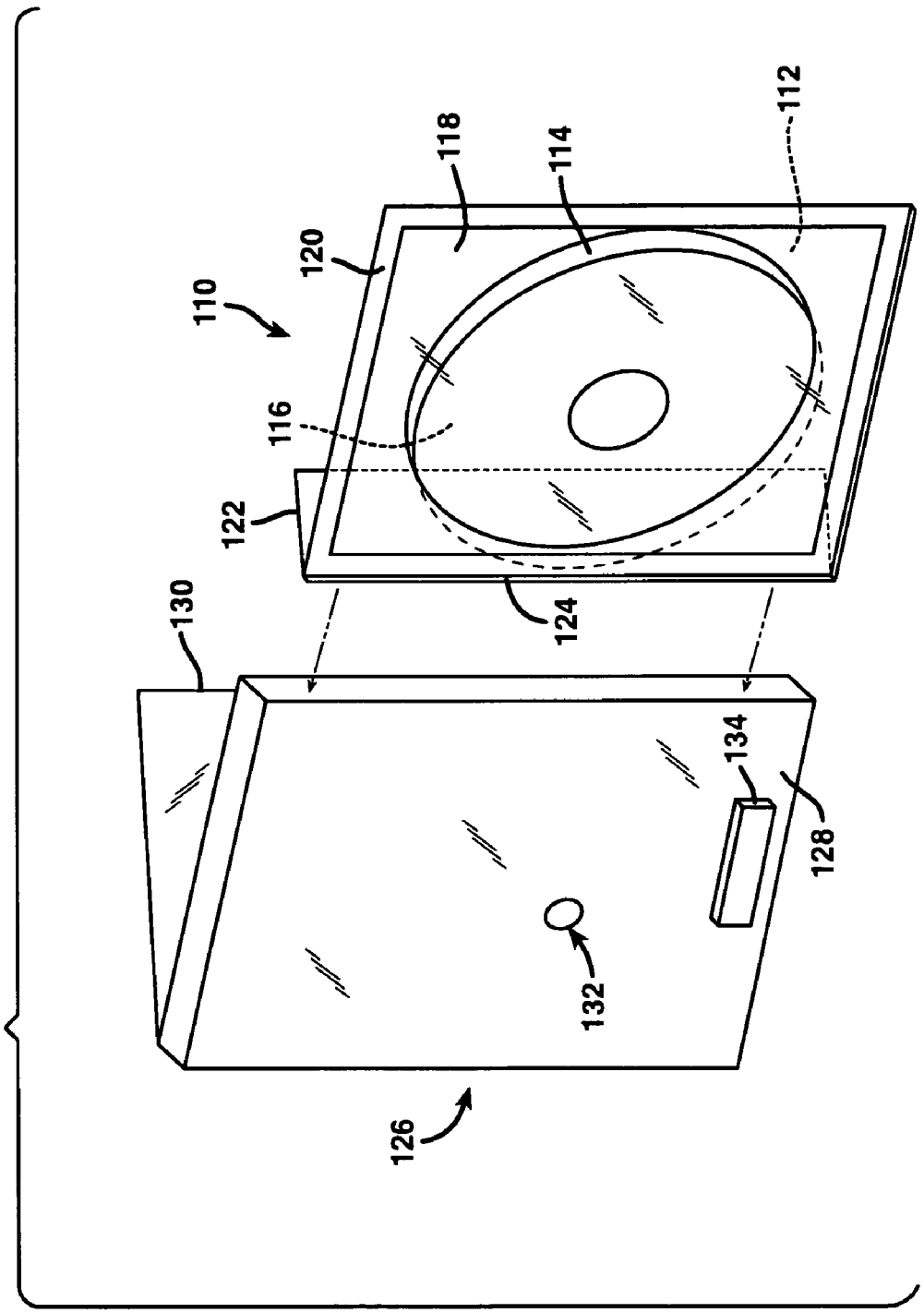
FIG. 3 is a perspective view of the package of FIGS. 1 and 2, showing its relationship to a carrying sleeve in which the package can be stored and displayed.

Referring to FIG. 3, a primary package 110 corresponds to primary package 10 of FIGS. 1 and 2, and includes an optical data storage medium 116, such as a compact disc. Web 118 covers the optical data storage medium (here, a compact disc) and is adhered to web 112 by means of a perimeter heat seal 120. An optional thermoplastic or paper flap 122 is attached to the primary package 110 by means of a hinge or fold 124 in the package. The primary package 110 can be inserted into a display or storage sleeve 126. The sleeve can be a rectilinear sleeve as illustrated, or of any other suitable shape to accommodate all or part of primary package 110. The sleeve is preferably a paperboard sleeve, but could instead be made from an alternative material such as a thermoplastic or thermoset material. A front wall 128 of the sleeve 126 can include an optional view window 132. This window can provide a means for visually determining when the optical data storage medium has become inactive. Thus, e.g. if a color change has occurred in the optical data storage medium, and all or part of the optical data storage medium changes color (e.g. from an original color to another color), this color will be exhibited through the view window 132. This mechanism thus provides the potential purchaser with a quality control check to make sure that a defective (i.e. prematurely inactivated) CD, DVD, or other optical device is not purchased. It will also provide an after-purchase indication that the lifetime of the optical data storage medium has expired. Window 132 can also/instead be installed directly on an appropriate portion of the primary package, either after the package is made, or on one of the webs making up the package. This embodiment can be useful especially in cases where the primary package is not sufficiently transparent to view the color of the optical data storage medium.

A flap 130 can optionally be included as part of the sleeve 126. The flap 130 is preferably a paperboard, but could instead be made from an alternative material such as a thermoplastic or thermoset material. Flap 130 can be used to form a booklet, and additionally pages or flaps can be added.

A human or machine readable unique identifier such as a barcode, 2D barcode or RFID tag 134 can optionally be included on the front wall 128 or at some other location on sleeve 126. Any unique identifier such as a bar code or RFID tag will offer information to a host computer that identifies and confirms the genuineness of the packaged optical data storage medium, and conversely identifies pirated or spurious copies of the contents of the optical data storage medium. In addition to providing authentication, a unique identifier on each package allows for product tracking and inventory management. Such identifiers can also be used in the event that it is necessary to recall defective products. Coupon offers and rebates are readily facilitated by having unique identifiers on each package. For example, a part or the entire purchase price of a limited lifetime disc could be applied to the purchase price of an archival quality disc. The unique identifier prevents a coupon or rebate from being used more than once by an unscrupulous consumer. An EAS tag 134 provides anti-theft protection, e.g. in a retail environment.

The package of the invention can optionally include a means for opening the package, and these are graphically depicted in FIGS. 4, 5, 6, and 7. Because optical data storage media are easily scratched or damaged by sharp objects, the package of the invention preferably has a means for opening the package, and especially an easy opening mechanism. Easy peel sealants can be beneficially used in a package having a pull-tab.

Figure 4:
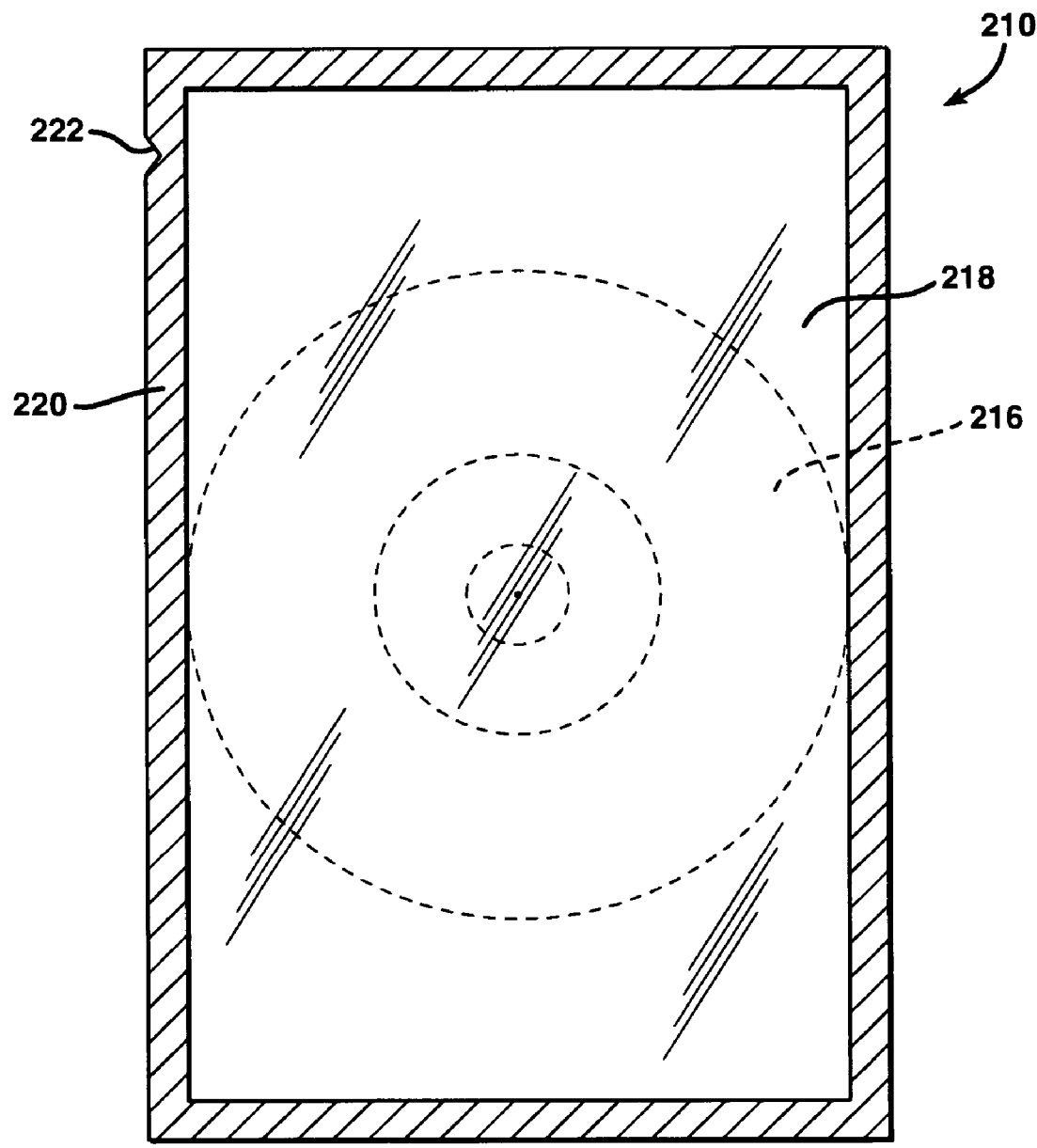
FIG. 4 is a view of the package of FIG. 1, and including a means for opening the package in the form of a tear notch.

Referring to FIG. 4, a primary package 210 corresponds to primary package 10 of FIGS. 1 and 2, and includes an optical data storage medium 216, such as a compact disc. Web 218 covers the optical data storage medium (here, a compact disc) and is adhered to web 216 by means of a perimeter heat seal 220. A tear notch 222 is disposed at an edge of the package. The tear notch can be made manually or by any well known notching device. In operation, the upper and lower portions of the package as viewed, i.e. the portion above the tear notch and the portion below the tear notch are grasped, and pulled in different directions to separate the package portions and provide access to the enclosed optical data storage medium.

Figure 5:
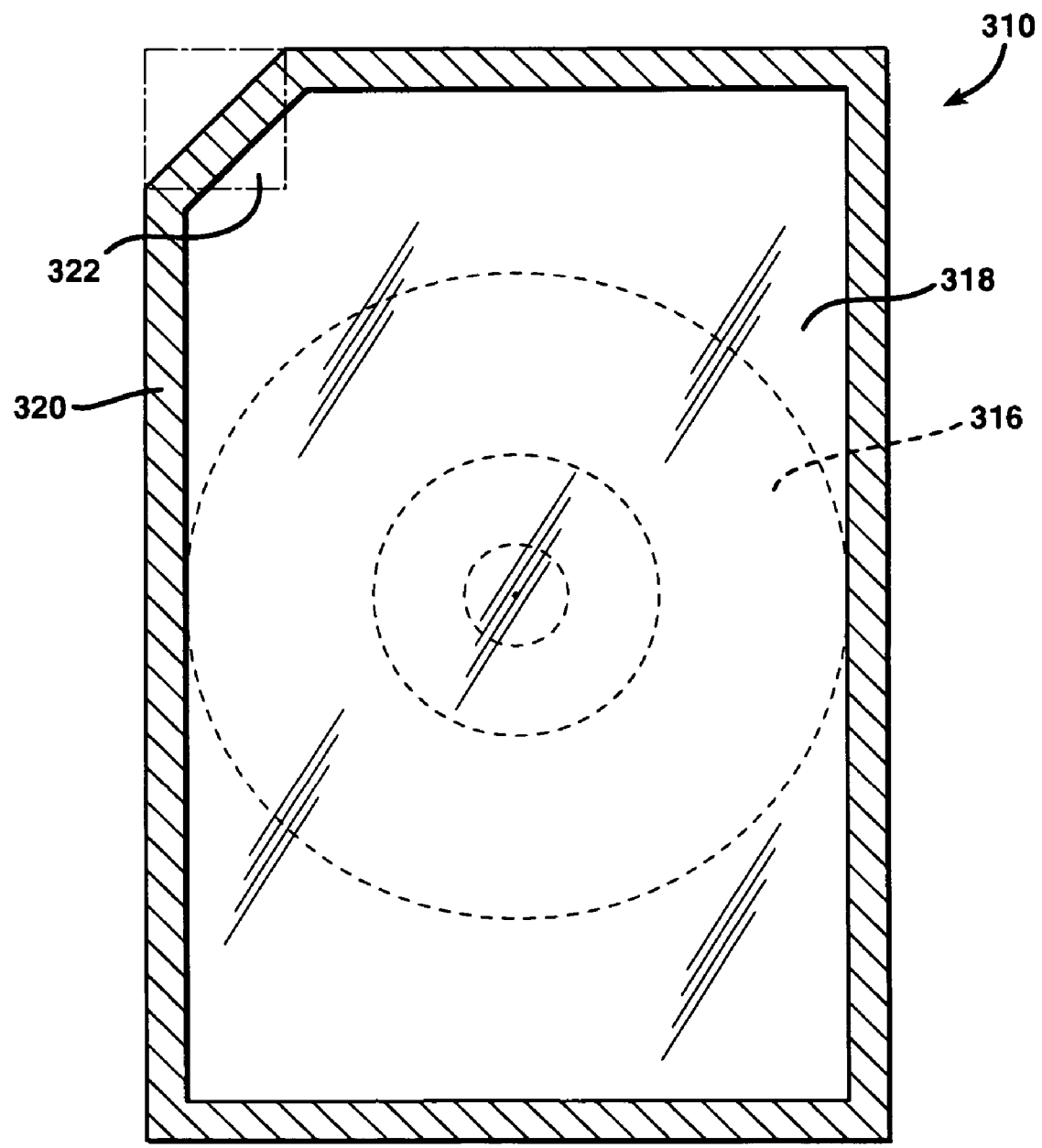
FIG. 5 is a view of the package of FIG. 1, and including a means for opening the package in the form of a pull tab.

Referring to FIG. 5, a primary package 310 corresponds to primary package 10 of FIGS. 1 and 2, and includes an optical data storage medium 316, such as a compact disc. Web 318 covers the optical data storage medium (here, a compact disc) and is adhered to web 316 by means of a perimeter heat seal 320. A pull tab 322 is disposed at a corner of the package. The pull tab can be made manually or by any well known mechanical device. In operation, the pull tab is grasped, and pulled toward the center of the package to provide access to the enclosed optical data storage medium. The pull tab of FIG. 5 can be coupled with easy peel sealants, i.e. the materials and sealing properties of the respective webs are beneficially such that the pull tab easily peels the packaging material, with a peel force of preferably less than 2.5 pounds, more preferably less than 2 pounds, such as less than 1.5 pounds, such as between 1 and 2 pounds.

Figure 6:
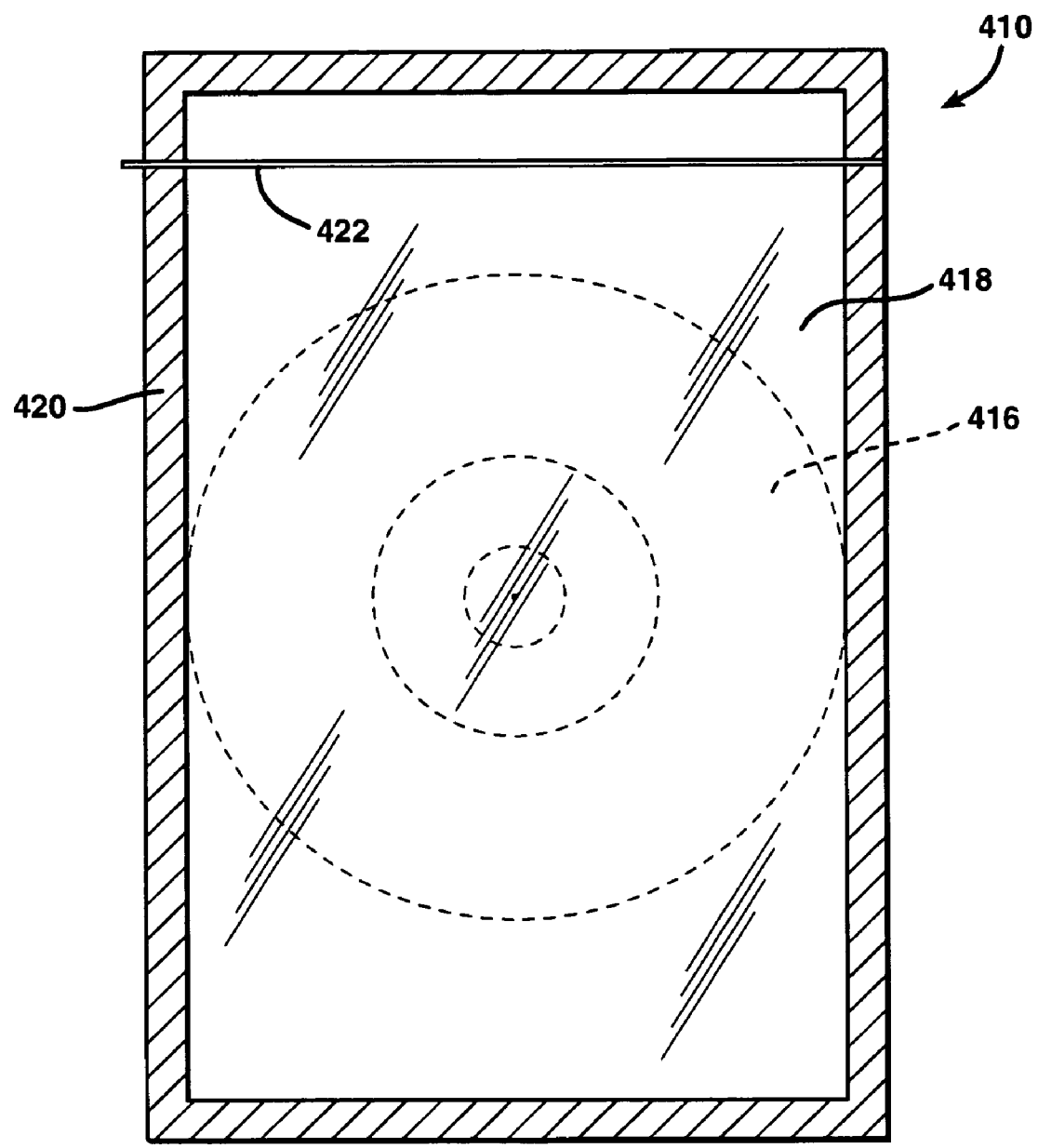
FIG. 6 is a view of the package of FIG. 1, and including a means for opening the package in the form of a tear strip.

Referring to FIG. 6, a primary package 410 corresponds to primary package 10 of FIGS. 1 and 2, and includes an optical data storage medium 416, such as a DVD. Web 418 covers the optical data storage medium (here, a DVD) and is adhered to web 416 by means of a perimeter heat seal 420. A tear strip 422 extends laterally across the package, and extends at one end (shown on the left side of FIG. 6) beyond the lateral edge of the package. The tear strip 422 can be installed in the package during production of the package by manual or mechanical means well known in the art. In operation, the tear strip is grasped, and pulled across the package to provide access to the enclosed optical data storage medium. The tear notch or tear strip of FIGS. 4 and 6 are preferably coupled with an easy tear packaging material; that is, either or both webs for such applications can beneficially have relatively low tear initiation and in particular low tear propagation values.

Figure 7:
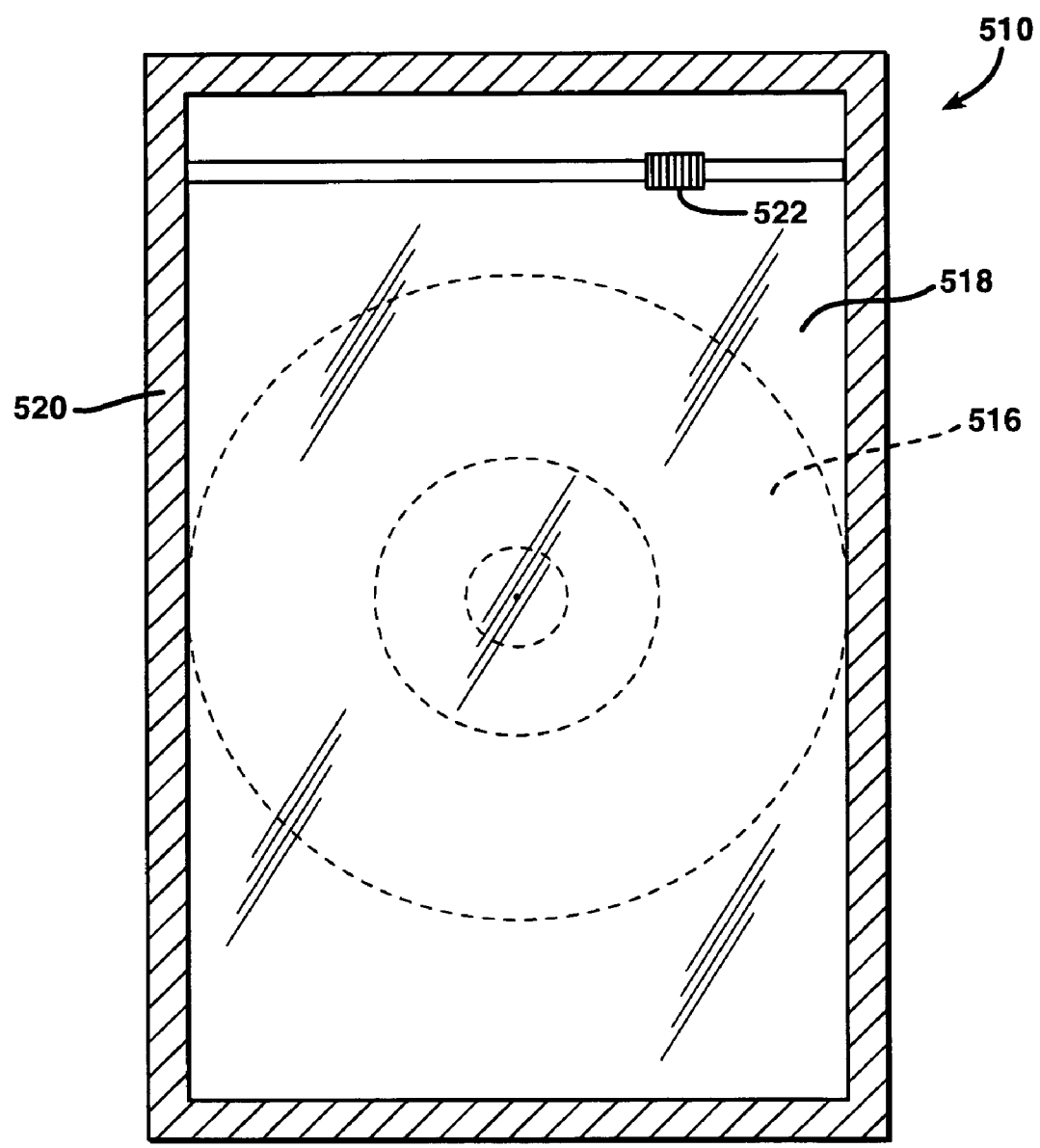
FIG. 7 is a view of the package of FIG. 1, and including a means for opening the package in the form of a plastic reclosable fastener.

Referring to FIG. 7, a primary package 510 corresponds to primary package 10 of FIGS. 1 and 2, and includes an optical data storage medium 516, such as a compact disc. Web 518 covers the optical data storage medium (here, a compact disc) and is adhered to web 516 by means of a perimeter heat seal 520. A plastic reclosable fastener 522 extends laterally across the package. The plastic reclosable fastener can be installed in the package during production of the package by manual or mechanical means well known in the art. The plastic reclosable fastener can take the form of a pressure sensitive adhesive strip or tape of a type well known in the art. In this embodiment, in operation, the two webs can be grasped and pulled in opposite directions to open the package and provide access to the enclosed optical data storage medium. The plastic reclosable fastener can alternatively take the form of a "zipper" having male and female fastener elements in the form of reclosable interlocking rib and groove elements. Either embodiment permits the package to be opened, closed, and reopened, i.e. provide reclosability. Two popular types of zippers are the "pinch" zipper, in which the male and female components are pressed together manually to close the zipper, and the "slide" zipper, in which a typically semi-rigid slider is installed on the zipper, and is run transversely along the length of the zipper to close the zipper. A pinch zipper can be opened much like the pressure sensitive adhesive strip or tape. A slide zipper is operated by grasping and laterally moving the slide across the face of the package to open the package, and provide access to the enclosed optical data storage medium. Reclosable mechanisms of the type just described allow the consumer to extend the play life of a disc once opened. The oxygen scavenging package can incorporate additional scavenging capacity to accommodate this feature (since original opening of the package and playing the disc will allow some ingress of oxygen into the disc). Conversely, it may be desirable, in order to limit the play life of a disc, to avoid excessive oxygen scavenging capacity in the relevant web, and/or not include a reclosability feature.

Figure 8:
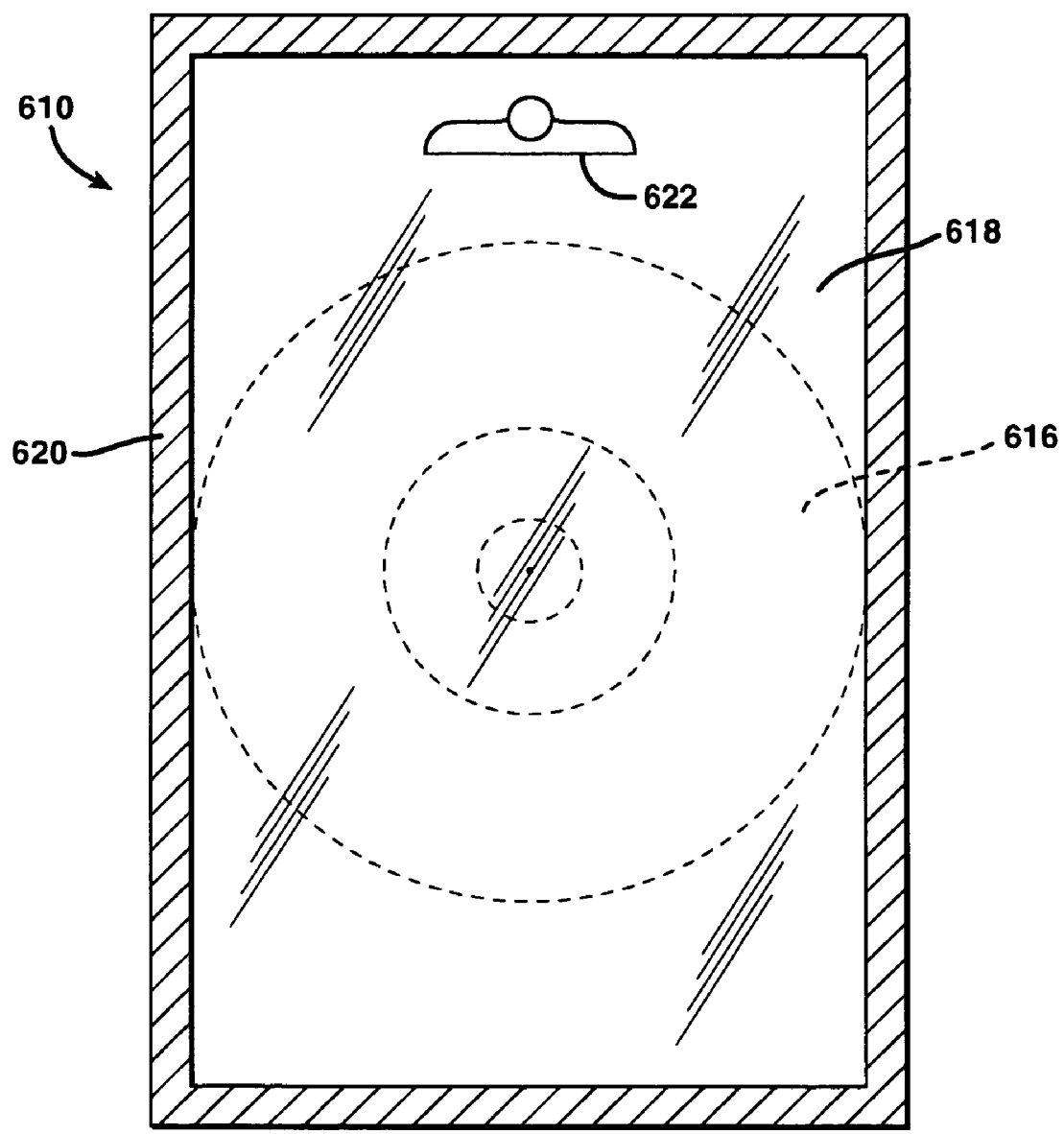
FIG. 8 is a view of the package of FIG. 1, and including a means for suspending the package.

Referring to FIG. 8, a primary package 610 corresponds to primary package 10 of FIGS. 1 and 2, and includes an optical data storage medium 616, such as a compact disc. Web 618 covers the optical data storage medium (here, a compact disc) and is adhered to web 616 by means of a perimeter heat seal 620. A means for suspending the package 622, such as a hanger hole, is disposed in an upper portion of the package. The means for suspending the package can be installed in the package during production of the package by manual or mechanical means well known in the art. One method is simply punching out material, in the form of a hanger as shown, in the finished package. Alternative means for suspending, such as hooks, adhesive spots, and the like, can be used to suspend the package.

For the embodiments of FIGS. 7 and 8, it is beneficial to include a seal between the plastic reclosable fastener and the means for suspending the package, and the optical data storage medium, to ensure the functional integrity of the optical data storage medium.

Figure 9:
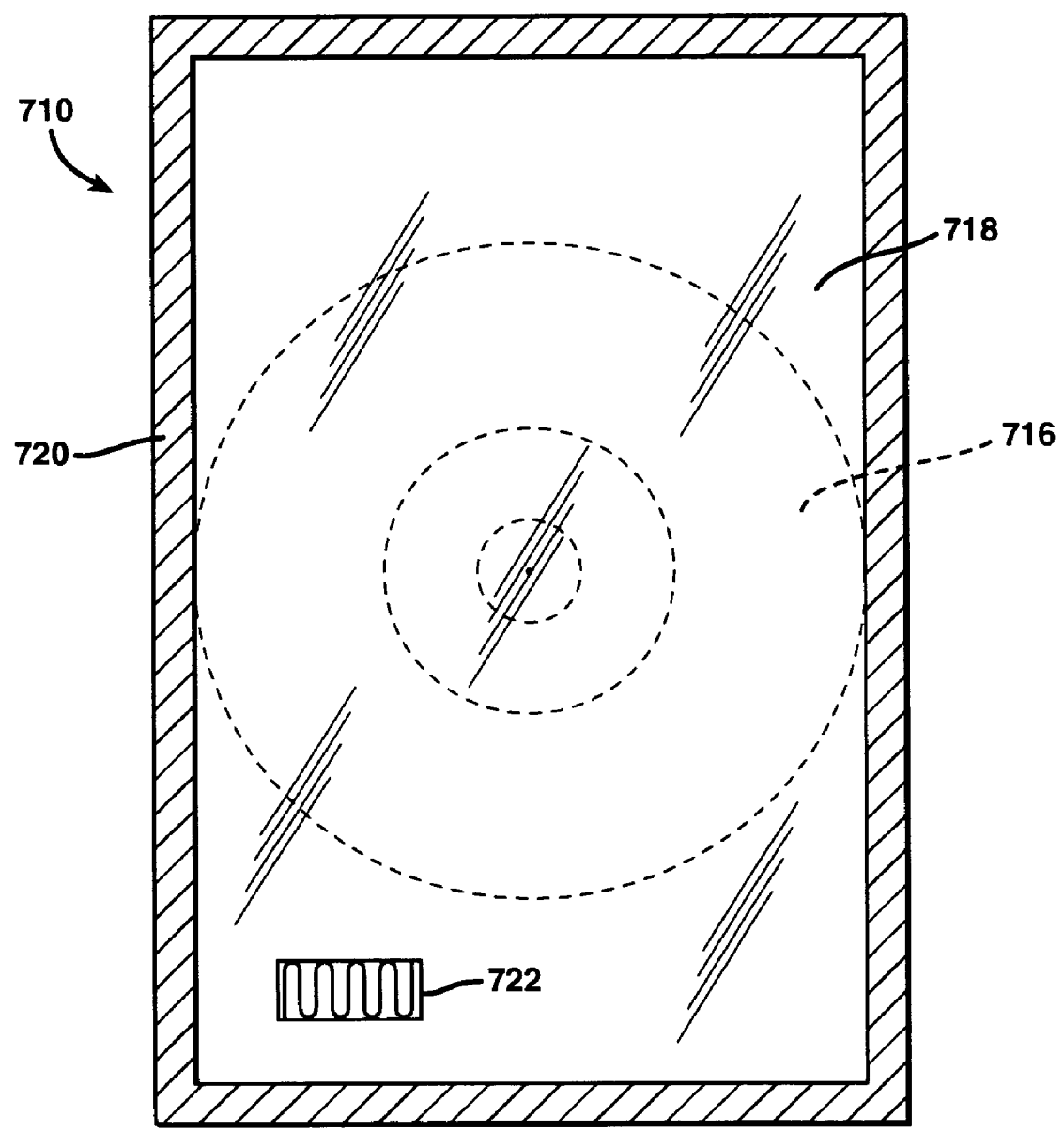
FIG. 9 is a view of the package of FIG. 1, and including a means for identifying the package.

Referring to FIG. 9, a primary package 710 corresponds to primary package 10 of FIGS. 1 and 2, and includes an optical data storage medium 716, such as a compact disc. Web 718 covers the optical data storage medium (here, a compact disc) and is adhered to web 716 by means of a perimeter heat seal 720. A means for identifying the package 722, such as an RFID tag, or specifically a tag based on Flying Null technology, is attached to one of the webs of the package (web 718 in FIG. 9). The means for identifying the package can be installed in the package during production of the package by manual or mechanical means well known in the art, such as by an adhesive backing on the tag which is then adhered to the relevant web, and can be installed either before or after the webs are brought together. A barcode, 2D barcode or the antenna portion of an RFID tag can be printed directly on at least one of the pouch webs, to avoid removal by a shoplifter. "Means for identifying" here is used to include systems aimed primarily at providing information to a human or electronic reader re: properties of an article. For example, a Flying Null tag could be incorporated in the package to provide authenticity checking.

Alternatively, the optional feature 722 can represent an anti-theft device such as an EAS tag.

Certain devices will function both as a unique identifier, and an anti-theft device.

Figure 10:
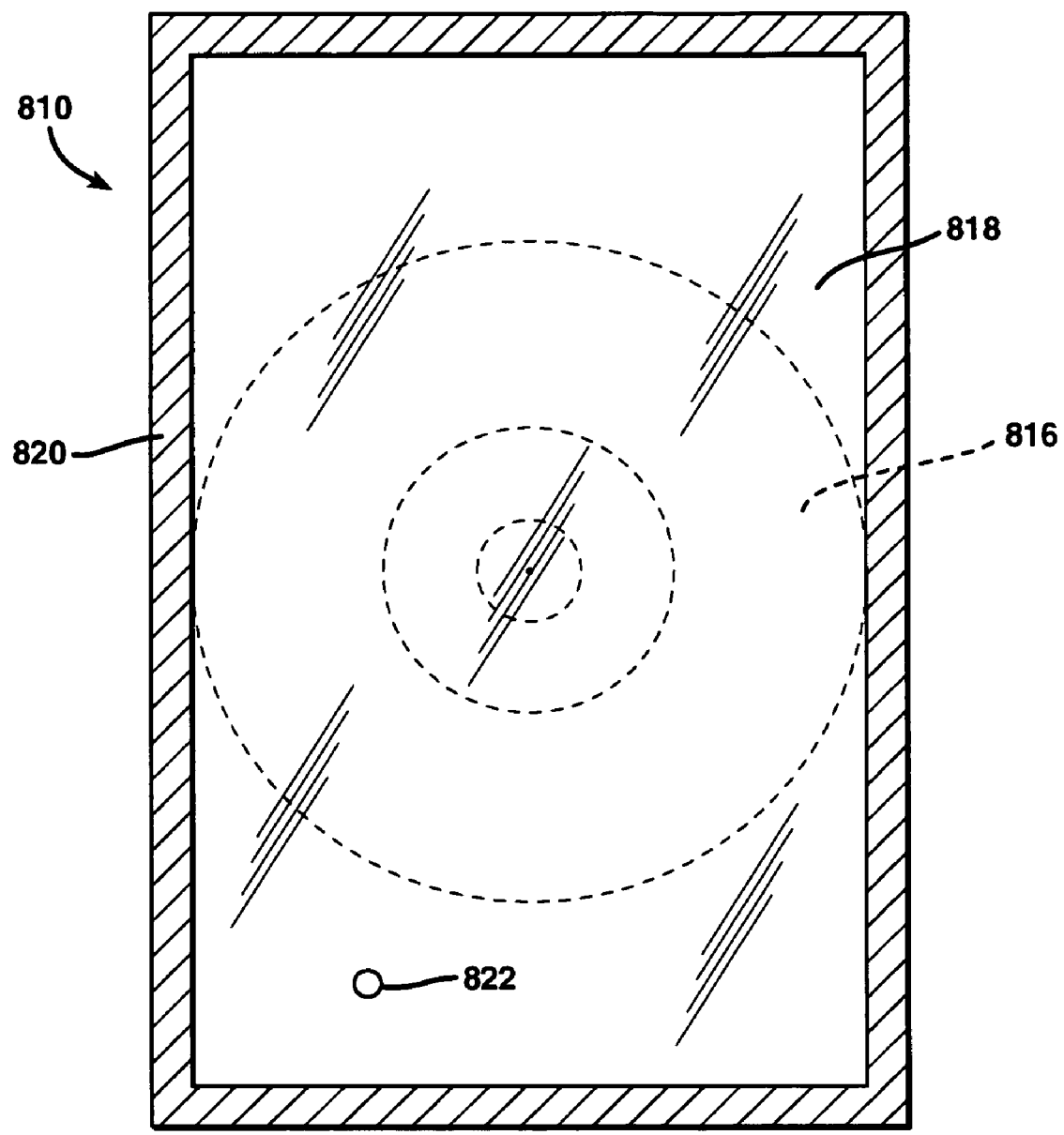
FIG. 10 is a view of the package of FIG. 1, and including a color patch.

Referring to FIG. 10, a primary package 810 corresponds to primary package 10 of FIGS. 1 and 2, and includes an optical data storage medium 816, such as a compact disc. Web 818 covers the optical data storage medium (here, a compact disc) and is adhered to web 816 by means of a perimeter heat seal 820. A color patch 822, such as a window installed on one of the webs of the package, can be used in concert with an ink forming part of the optical data storage medium. The color patch 822 can be installed in the package during production of the package by manual or mechanical means well known in the art, and can be installed either before or after the webs are brought together. Printed text such as "disc expired when this color" can be printed adjacent color patch 822, and the printed color of the patch is selected to identify the color of the optical data storage medium that has become inactive.

Figure 11:
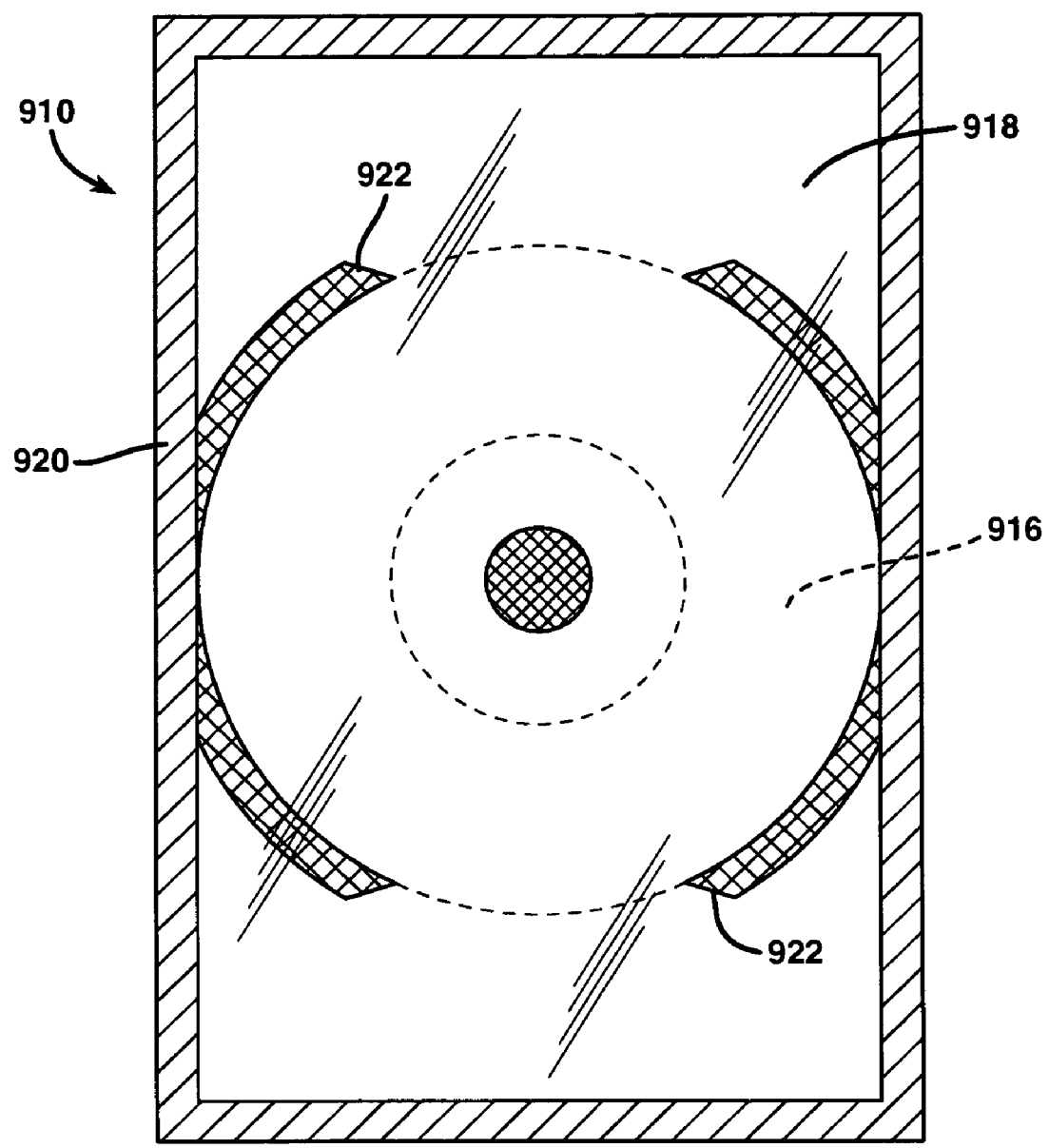
FIG. 11 is a view of the package of FIG. 1, and including sealed regions around portions of the optical data storage medium.

Referring to FIG. 11, a primary package 910 corresponds to primary package 10 of FIGS. 1 and 2, and includes an optical data storage medium 916, such as a compact disc. Web 918 covers the optical data storage medium (here, a compact disc) and is adhered to web 916 by means of a perimeter heat seal 920. Sealed portions 922, the sealed portions spaced apart from the edges of the package and therefore not forming part of the perimeter seal, help to hold the optical data storage medium in place, and prevent substantial shifting of the optical data storage medium during package manufacture, shipping, and display. The sealed portions 922 can be made during production of the package, either by the same sealing mechanisms used to produce the perimeter seals, or by a separate sealing device. The sealed portions 922 can be made simultaneously with the perimeter seals, or as a separate step. Sealed portions can occupy any portion of the package, and can be discontinuous, as shown here, or be disposed in a continuous arrangement, e.g. around the entire circumference of the optical data storage medium. It should be noted that in the various embodiments of the invention as disclosed herein, a perimeter seal and sometimes additional sealed areas intermediate the edges of the package are disclosed. The remaining portions of the interface between the two respective webs can remain unsealed, or can be partially or wholly sealed by any suitable means. In some cases, a peelable bond will form in some or all of the remaining portions of the web interface (those portions of the package in which the webs are in contact with one another), such that the respective webs will be in intimate contact, often simply as a result of the package making process. This peelable bond will sometimes keep the webs in contact during normal storage and shipment, but allow the webs to be easily peeled apart in these portions of the package.

In FIG. 2, the package is shown with some space between the lateral edges of the optical data storage medium, and the respective adjacent perimeter seal and interior portions of the respective webs. By the selection of an appropriate package procedure, the processor/packager can choose to control the extent of this open volume or cavity on each edge of the optical data storage medium. To some extent, an open volume can also be established between the major outer surfaces of the optical data storage medium, and the interior surface of each respective web. Either or both of these embodiments can be done e.g. to speed up the package making process, or to allow a space around the optical data storage medium for modified atmosphere and/or the action of the oxygen scavenger.

The vertical depth of a typical optical data storage medium is about 1.2 mm thick.

Figure 12:
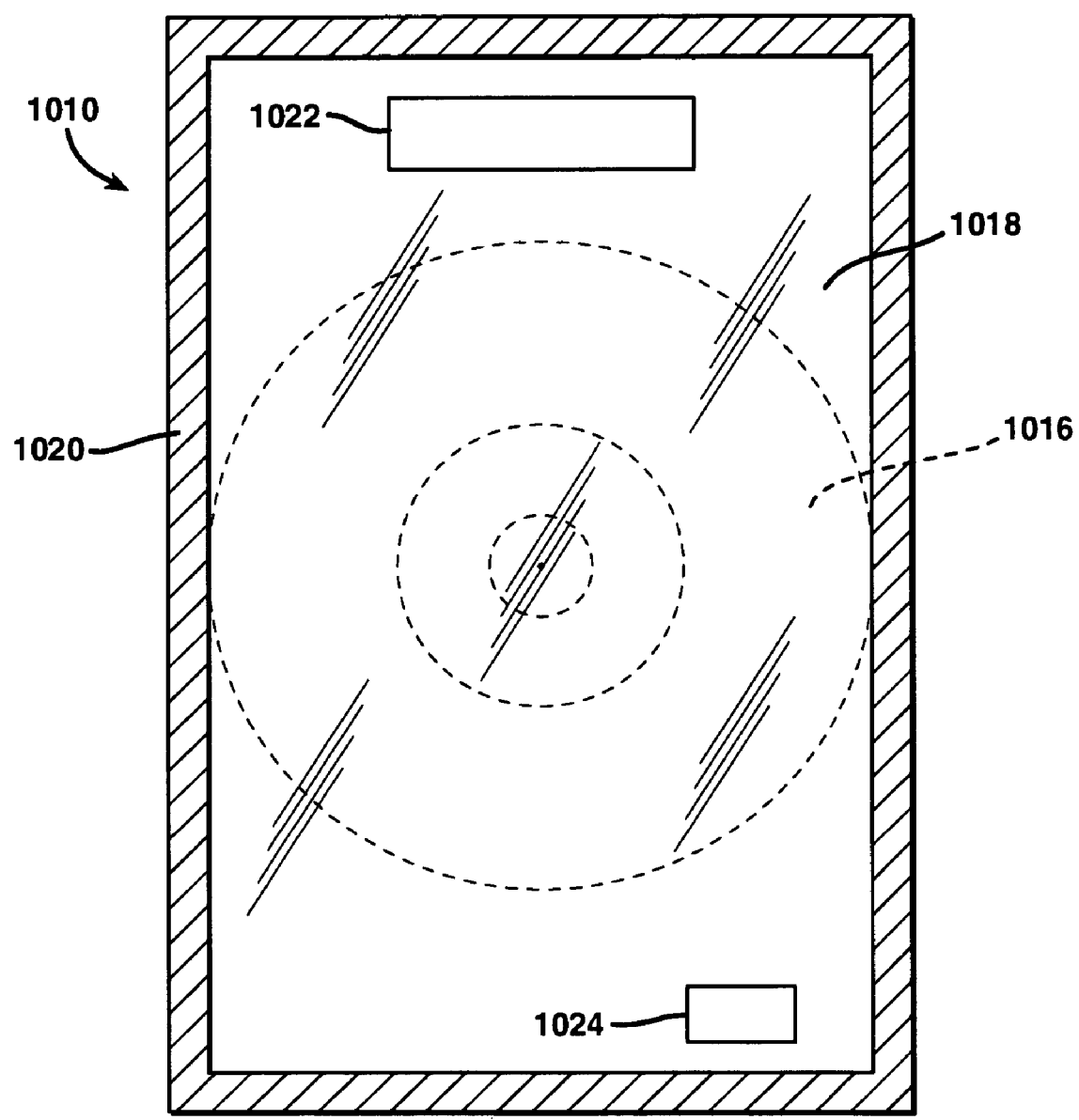
FIG. 12 is a view of the package of FIG. 1, and including a printed label.

Referring to FIG. 12, a primary package 1010 corresponds to primary package 10 of FIGS. 1 and 2, and includes an optical data storage medium 1016, such as a compact disc or DVD. Web 1018 covers the optical data storage medium (here, a compact disc) and is adhered to web 1016 by means of a perimeter heat seal 1020. Printed indicia 1022 and 1024 can provide printed information or graphics. For example, printed indicia 1022 can be a preprinted pressure sensitive label with advertising information, and printed indicia 1024 can include a "use by" date or expiration date. Printed indicia can also include one and two-dimensional barcodes. These indicia can be made during production of the package, by printing or adherence of pre-made labels to the package, or can be printed or adhered to either or both of the respective webs prior to package production, by any suitable printing process such as ink jet, flexographic, rotogravure, or the like.

Figure 13:
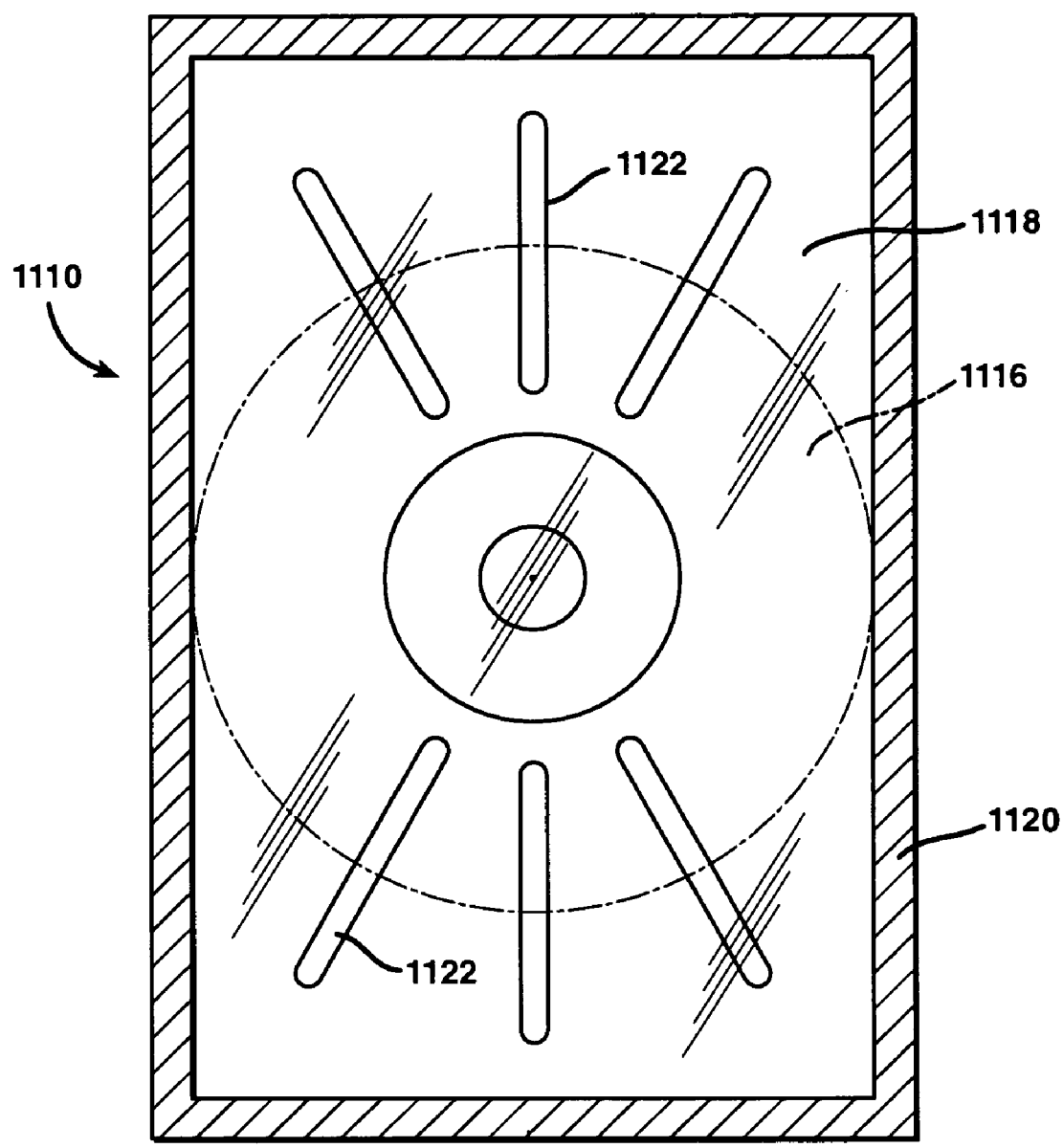
FIG. 13 is a view of the package of FIG. 1, and including a plurality of channels in the package.

Referring to FIG. 13, a primary package 1110 corresponds to primary package 10 of FIGS. 1 and 2, and includes an optical data storage medium 1116, such as a compact disc. Web 1118 covers the optical data storage medium (here, a compact disc) and is adhered to web 1116 by means of a perimeter heat seal 1120. One or more channels 1122 can be included in the final package. These channels can be simply raised portions of either or both of webs 1118 or 1116. The channels can serve at least two purposes. First, they can provide additional stiffness to the package, which can be important in packaging optical data storage media with strict flatness requirements. Secondly, in cases where only one web includes an oxygen scavenger, the channels expose more surface area of the scavenging web, allowing more rapid oxygen depletion in the package.

Figure 14:
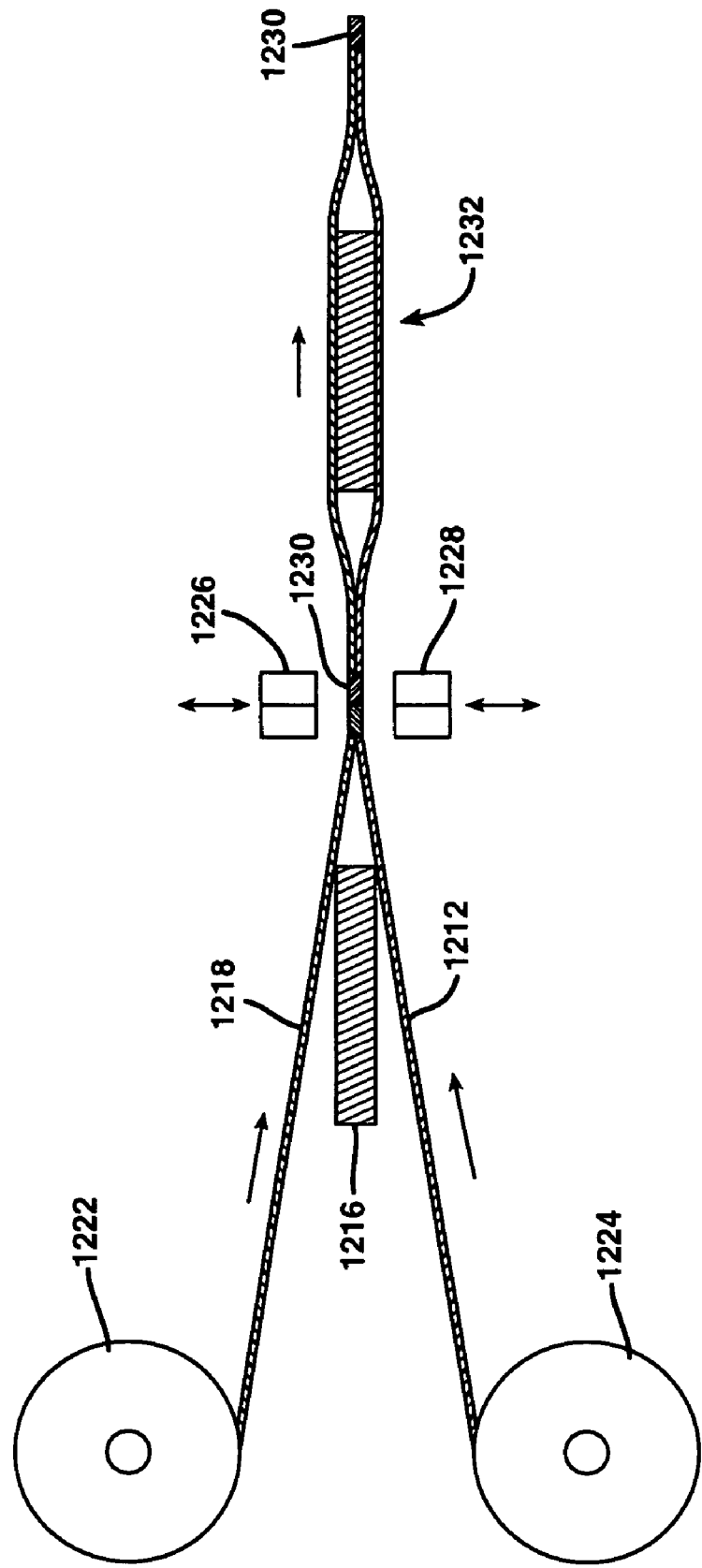
FIG. 14 is a schematic view of a process and apparatus for making a package in accordance with the invention.

The package of FIG. 1 and the related figures, involving the use of two webs, can be made by any suitable process. FIG. 14 schematically discloses such a process, in which first web 1218 is drawn from a roll 1222, and second web 1212 is drawn from a roll 1224. An optical data storage medium 1216 is placed between the two webs, manually or mechanically as appropriate, and the optical data storage medium, sandwiched between the two webs, is advanced past a seal mechanism 1226/1228. In one embodiment, a double seal 1230 is made, which can then be cut bilaterally to produce the trailing seal of a leading package, and the lead seal of a trailing package in the product stream. Finished package 1232 can then be removed by suitable means for storage, distribution, or further processing (e.g. to add additional components, printing, etc. to the package.)

Figure 15:
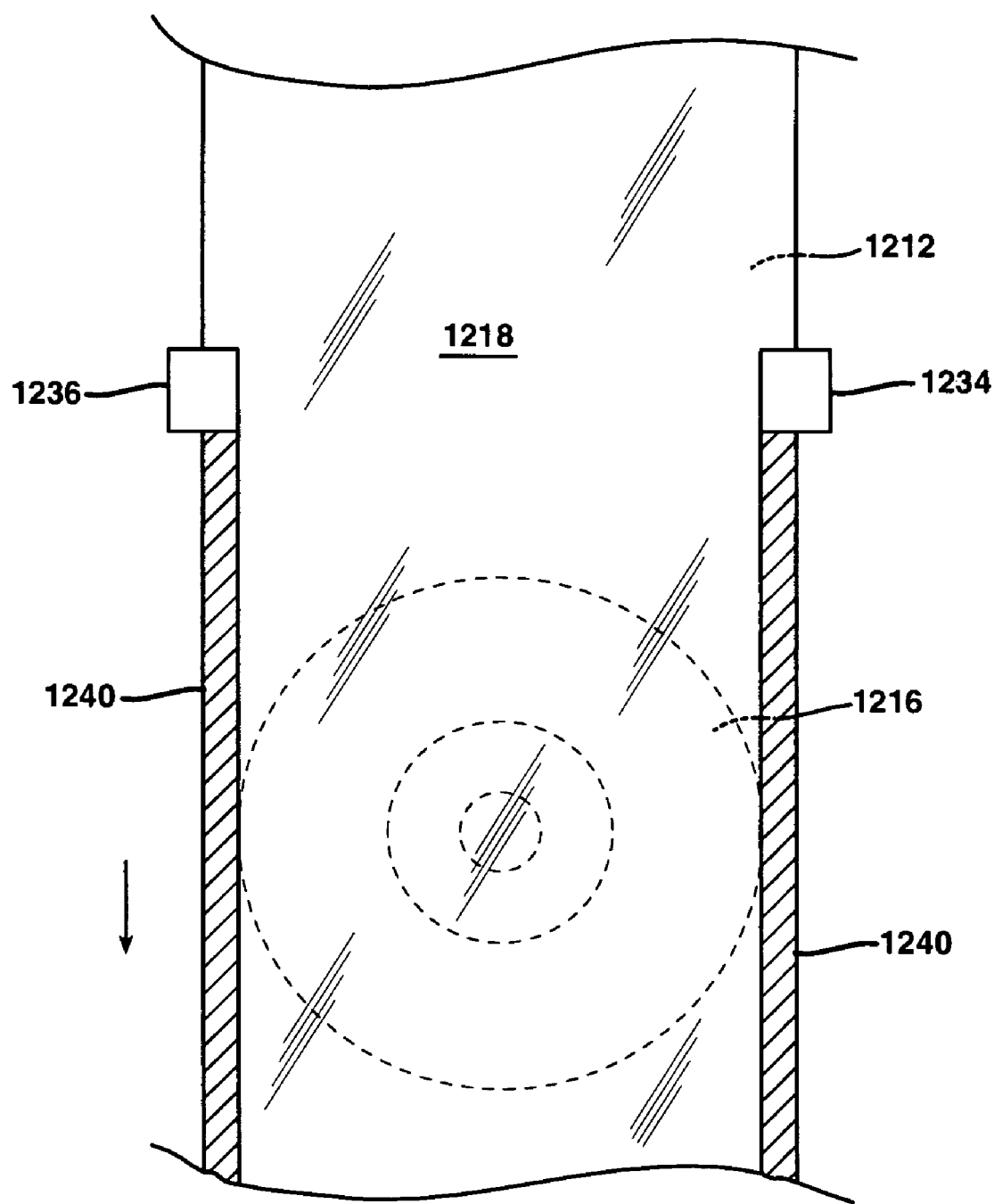
FIG. 15 is a top plan view of the process and apparatus of FIG. 14 (not to scale)

The formation of two of the perimeter seals of the package of FIG. 14, is illustrated in FIG. 15. Congruent webs 1218 and 1212 move in the direction of the arrow. An optical data storage medium 1216 is inserted or placed between the webs, and described herein. The lateral edges of the two webs advance past seal bars 1234 and 1236. A heat seal or other suitable seal is made resulting in perimeter seals 1240.

One Web Embodiments

1. Seamless Tubing

An alternative to the package format of FIGS. 1 to 15 is a package format using only one web, either as a seamless tube, or a seamed tube made from layflat film, and having a longitudinal seal therein to form the tube.

Figure 16:
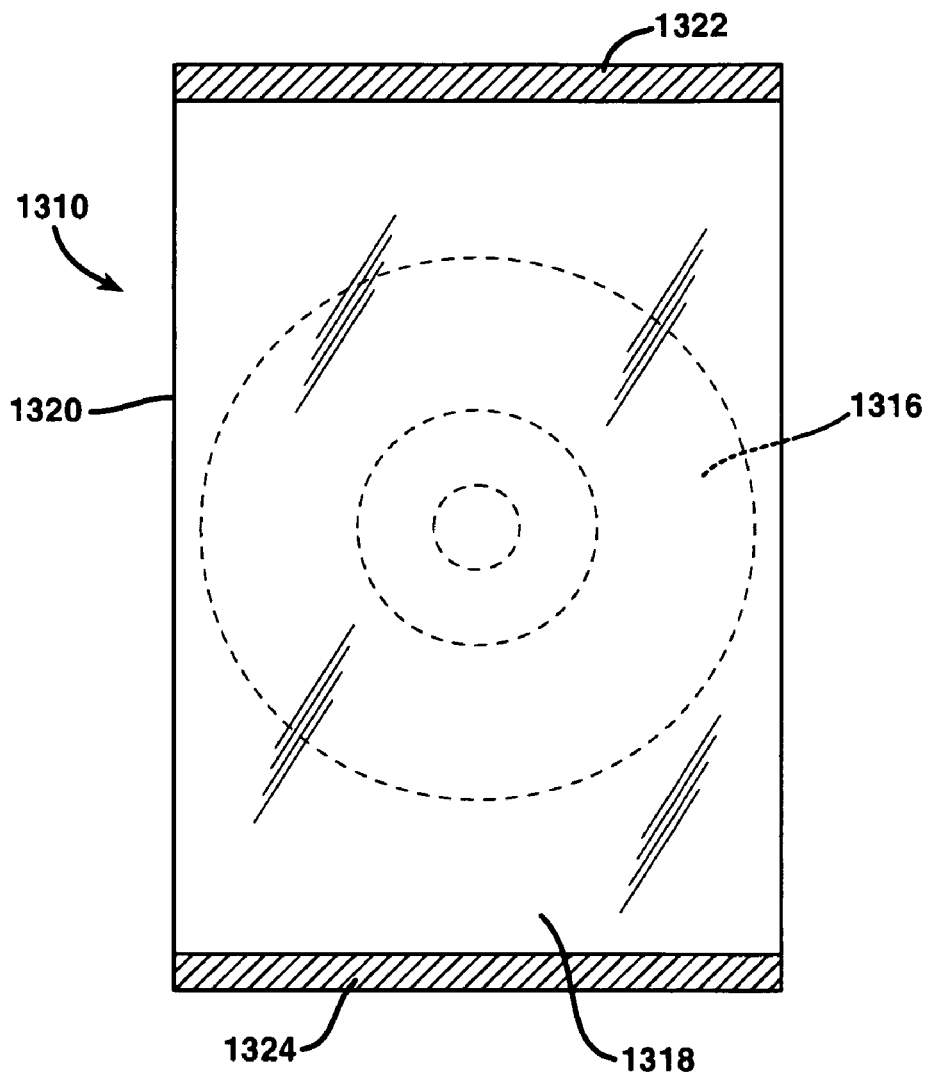
FIG. 16 is a plan view of an alternative embodiment of a package in accordance with the invention.

Referring to FIG. 16, a primary package 1310 corresponds generally to primary package 10 of FIGS. 1 and 2, and includes an optical data storage medium 1316, such as a compact disc. Web 1318, in the form of a tube (see FIG. 17) envelops the optical data storage medium. A transverse seal 1322 is made during the production of the package, and closes one longitudinal end of the tube segment that will form the package. After insertion of the optical data storage medium in the open end of the tube, the tube is sealed closed by seal 1324 to complete the package.

Seals can be made by any suitable method, such as those disclosed herein for the package of FIGS. 1 to 15.

The package of FIG. 16 can be produced generally in a continuous process generally like that disclosed in FIG. 14, but in which a single continuous tube of material is fed from a single roll. Sealing means well known in the art can be used to form transverse seal 1322, and an optical data storage medium can be inserted manually or mechanically into the open end of the tube segment. Thereafter, seal 1324 can be made to complete the package. After the first seal 1322 is made, and before, during, and/or after the optical data storage medium is inserted into the tube segment, the interior of the package can optionally be vacuumized, gas flushed, revacuumized, compressed (e.g. manually or by mechanical means such as a roller or block placed on top of the tube, and/or run along the outer length of the tube toward the open end of the tube segment, such that a substantial portion of the interior atmosphere of the tube segment is expelled from the tube), before creating seal 1324.

Alternatively, the package of FIG. 16 can be made as described above, but the optional steps of vacuumization, gas flushing, gas purging, revacuumization, and/or compression can be performed before either of transverse seals 1322 and 1324 are made.

A gas purge step can be performed before insertion of the optical data storage medium in the open end of the tube.

2. Seamed Tubing

Figure 18:
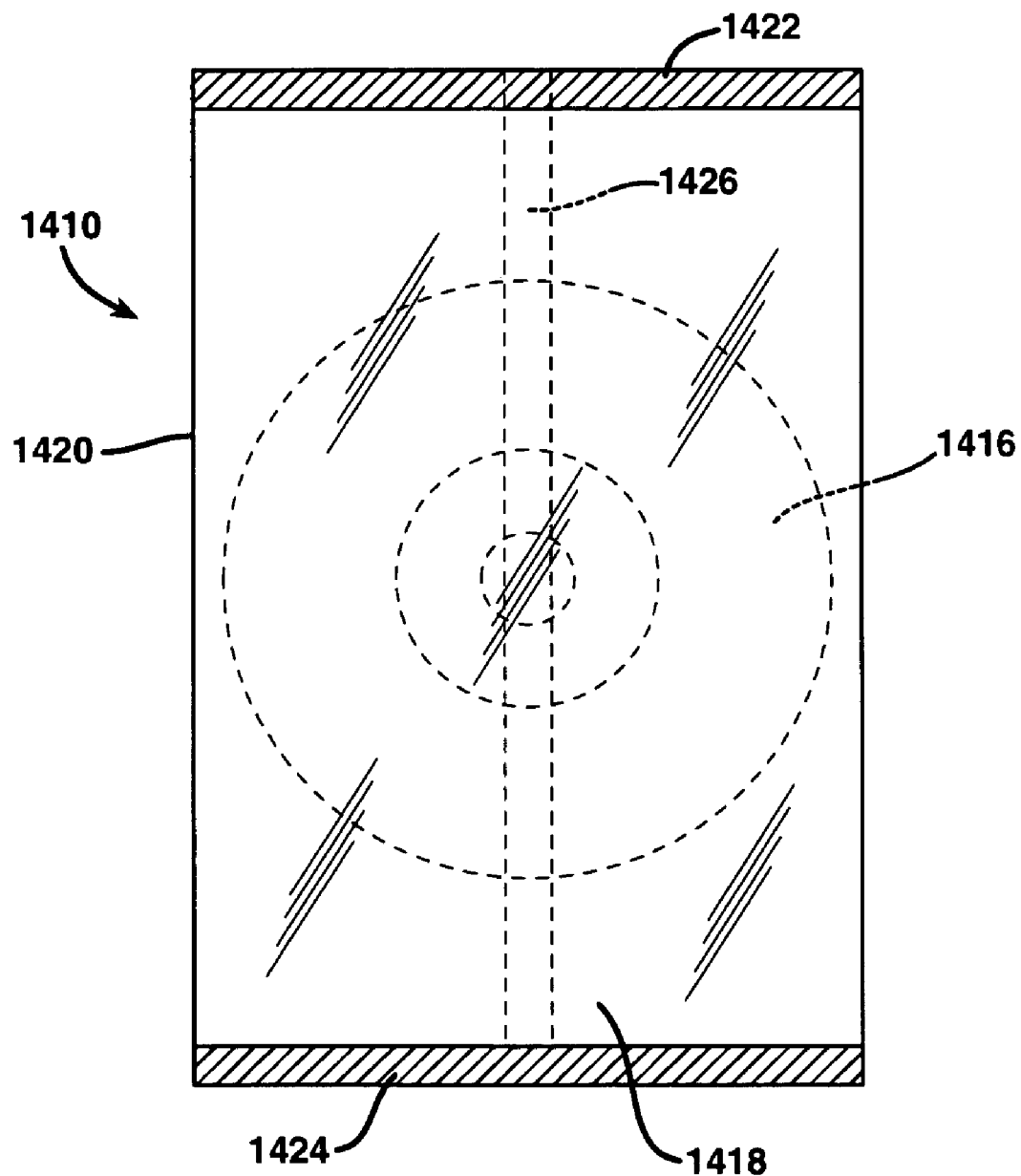
FIG. 18 is a plan view of another alternative embodiment of a package in accordance with the invention.

Referring to FIG. 18, a primary package 1410 corresponds generally to primary package 10 of FIGS. 1 and 2, and includes an optical data storage medium 1416, such as a compact disc. Web 1418, in the form of a seamed tube, envelops the optical data storage medium. A transverse seal 1422 is made during the production of the package, and closes one longitudinal end of the tube segment that will form the package. After insertion of the optical data storage medium in the open end of the tube, the tube is sealed closed by seal 1424 to complete the package.

Seals can be made by any suitable method, such as those disclosed herein for the package of FIGS. 1 to 15.

Web 1418 in this embodiment is fed as a layflat web from a roll of film, and then converted to a tube using the "sailor's collar" or forming collar of an otherwise conventional vertical form/fill/seal (VFFS) or horizontal form/fill/seal (HFFS) process. A longitudinal seal 1426, which can be either a lap seal or a fin seal, can be made by conventional means. The longitudinal seal 1426 serves to form the layflat web into a tube open at both ends. Before or after formation of the transverse seal 1422, an optical data storage medium can then be inserted into the open tube. If the transverse seal 1422 has not yet been formed at this point in the production process, the optical data storage medium can be inserted from either end of the tube.

Vertical form/fill/seal (VFFS) packaging systems are well known to those of skill in the art, and described for example in U.S. Pat. No. 4,589,247 (Tsuruta et al), U.S. Pat. No. 4,656,818 (Shimoyama et al.), U.S. Pat. No. 4,768,411 (Su), and U.S. Pat. No. 4,808,010 (Vogan), all incorporat herein by reference in their entirety. In such a process, lay-flat thermoplastic film is advanced over a forming device to form a tube, a longitudinal (vertical) fin or lap seal is made, and a bottom end seal is made by transversely sealing across the tube with heated seal bars. A product is introduced into the formed tubular film. The pouch is then completed by sealing the upper end of the tubular segment, and severing the pouch from the tubular film above it. The process can be a two-stage process where the creation of a transverse heat seal occurs at one stage in the process, and then, downstream of the first stage, a separate pair of cooling/clamping means contact the just-formed transverse heat seal to cool and thus strengthen the seal. In some VFFS processes, an upper transverse seal of a first pouch, and the lower transverse seal of a following pouch, are made, and the pouches cut and thereby separated between two portions of the transverse seals, without the need for a separate step to clamp, cool, and cut the seals.

In a conventional VFFS process, the product is typically a flowable product that is introduced through a central, vertical fill tube to the formed tubular film. When used to form pouches of the present invention, an optical data storage medium can be introduced at a suitable stage in each pouch as it is formed. Insertion of each optical data storage medium unit into each respective pouch can be done manually or through suitable mechanical means. One method is the indexing of optical data storage medium units in synchronous operation with pouch formation, using technology analogous to that of U.S. Pat. No. 5,467,581 (Everette), incorporated herein by reference in its entirety.

Figure 23:
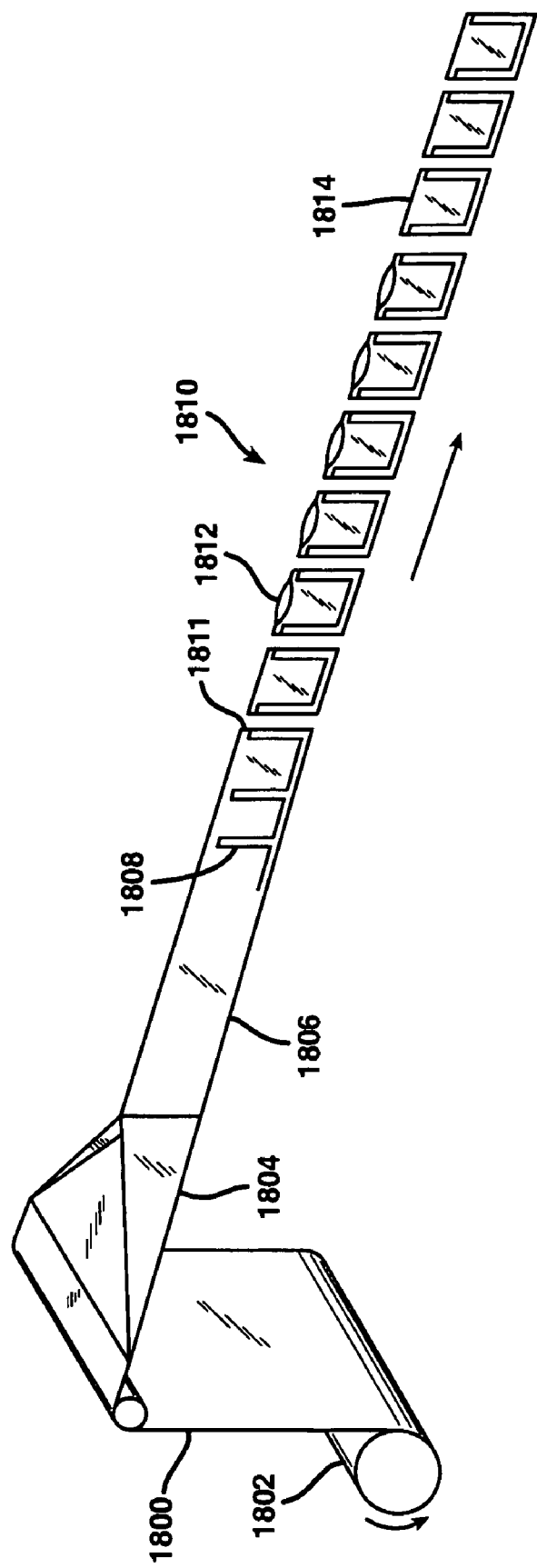
FIG. 23 is a schematic view of a process and apparatus for making a package in accordance with the invention.

Horizontal form/fill/seal (HFFS) packaging systems are also well known to those of skill in the packaging industry. An example of this process and apparatus is shown in FIG. 23. Web 1800 is unwound from a roll 1802, then advanced to a forming plow 1804 to convert the layflat web to a folded web (typically centerfold film). Thus one side or edge of the pouches to be made will comprise a fold 1806. This fold can be optionally sealed as shown, or else left as a folded edge of the pouch. Side seals 1808 are made to define a plurality of vertically arranged pouches 1810. Each pouch is cut off from the trailing edge of the web by an appropriate cutting mechanism (not shown) at position 1811, an optical data storage medium (not shown) is inserted or dropped into the open mouth 1812 of each pouch, and the pouch mouth is then closed by a sealing mechanism 1814 such as a heat seal, or any suitable means.

Figure 17:
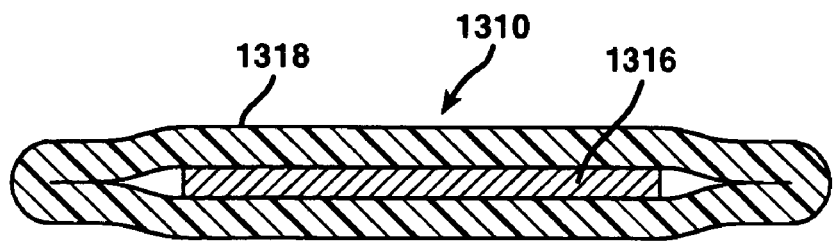
FIG. 17 is a side elevational view (not to scale) of the package of FIG. 16.

As with the embodiment of FIGS. 16 and 17, the interior of the package can optionally be vacuumized, gas flushed, revacuumized, compressed (e.g. manually or by mechanical means such as a roller or block placed on top of the tube, and/or run along the outer length of the tube toward the open end of the tube segment, such that a substantial portion of the interior atmosphere of the tube segment is expelled from the tube), before creating seal 1424.

In another alternative, the optical data storage medium can be placed on one web, and covered by a second web, before either of transverse seals 1422 and 1424 are made.

The longitudinal seal 1426 can be located at either side of the layflat tubing, or at any position between the two sides of the layflat tubing.

As with the seamless tube embodiment, Alternatively, the package can be made as described above, but the optional steps of vacuumization, gas flushing, revacuumization, and/or compression can be performed before either of the transverse seals are made.

A gas purge step can be performed before insertion of the optical data storage medium in an open end of the tube.

When using oxygen scavenging film, such as OS1000™ available from Sealed Air Corporation, or another oxygen scavenger as a film, film layer, or coating, as all or part of the construction of webs of the invention, one or more of a number of packaging process and product quality advantages can be obtained as compared to thermoformed packages. These include:

1. Packaging Speeds: Form/Fill/Seal packaging format (pouches) process does not require preset times for such functions as thermoforming, vacuumization, gas flush, sealing, cutting, etc. The operation is continuous with no start/stop cycling. When using form/fill/seal technologies the speeds are equal to or slightly better when packaging 1 up (single lane) but efficiencies are increased substantially when packaging multiple lanes of product.

2. Material Utilization Inventory. Only one oxygen scavenging material is required to form an effective package. The bottom or forming web of a conventional thermoformed pouch is eliminated.

3. Cost Minimization. A typical oxygen scavenging forming web used in optical data storage medium applications is thick (10 mils) and costly—typically over half of the total packaging materials cost. Using an oxygen scavenging web in form/fill/seal formats eliminates the use of a thermoformed web and reduces the material costs substantially. Additionally, form/fill/seal equipment is in many cases less costly than thermoforming equipment such as the type available from Tiromat.

4. Process and Equipment Versatility. An oxygen scavenging web can be used in appropriate end uses without vacuumization and gas flushing. Since an oxygen scavenging web is often active at the time of packaging or soon after, the excess atmosphere within the packages can be squeezed out by compression, and sealed. Oxygen scavenging film will immediately begin to scavenge the oxygen and will provide a low oxygen package suitable for an optical data storage medium. Modified atmosphere packaging may not be needed for many customers and applications. Gas purging of the package can be used in combination with a compression step.

Compression is only one of the options available for use with a form/fill/seal packaging operation. The pouches can be in-line vacuumized only, vacuumized and gas flushed, compressed to expel excess atmosphere, compressed with gas flush, or any suitable combination of these steps. Gas flushing or gas purging is typically performed before a compression step.

The packaging equipment can be configured to suit the storage requirements of the particular product, and the needs of each customer. Specifically, the equipment can be configured to form a single tube using single wound web into which the product is loaded. Alternatively, a single wound web can be formed into two (or more) tubes by sealing longitudinally after the longitudinal edge(s) are folded to form a tube (or multiple tubes). Lap, edge and/or fin seals can be employed in the longitudinal direction as the product is loaded into the resulting tube. Transverse seals can then be applied on both the leading and trailing edges to complete the package. Either the transverse seal or the longitudinal seal can be applied first depending on the type equipment and customer needs, or alternatively can be applied simultaneously.

The production of the oxygen scavenging package can alternatively be accomplished by the use of two webs (as disclosed above), e.g. from two rolls of oxygen scavenging film, which are sealed together, optionally after triggering of the films, so that the product is "sandwiched" between the two webs. Multiple tubes can also be made with two webs of film by longitudinally sealing with one or multiple band sealers.

In another alternative, the oxygen scavenging package can be supplied in the form of tubing. The tubing requires only end-seals and transverse cuts to effectively isolate and contain the optical data storage medium. The tubing is slit and sealed during the packaging process, preferably after triggering. The advantage is that the tubing can be produced directly via an annular coextrusion process without the need for factory edge slitting or longitudinal factory seals. Tubing can be supplied in the form of rolls. Optionally, the tubing may be printed, and can contain one transverse seal.

Versatility and efficiency of form/fill/seal oxygen scavenging packaging extends to other packaging form/fill/seal formats and methods as well. Some features of these formats and methods follow.

a. An oxygen scavenging web, either heat shrinkable or non-heat shrinkable, can be used to overwrap chipboard sleeved product.

b. The pouches can be pre-made off line and used on a secondary loading and sealing machine. Form/Fill/Seal equipment used to convert rolls of materials into sealed pouches are also more effectively coupled with secondary equipment such as that used to insert the product into printed chipboard sleeves. Depending on the equipment and method of forming the material into the pouch, there may be 1, 2 or 3 seals in the pre-made pouch into which the product is loaded. The secondary packaging machine is then employed to apply the required number of remaining seals after the level of oxygen in the package is reduced using vacuum and/or gas flush and/or gas purge and/or compression.

c. The web can optionally be formed into a desired shape, such as a sheet, tube, or novelty shape, and inserted with the product into a secondary oxygen barrier package.

d. The current thermoform packaging is horizontal only, thus limiting the user in the auxiliary equipment (labelers, code daters, etc) which can be employed. Form/fill/seal technologies can, depending on the customers needs and requirements, allow either horizontal or vertical pouch production and loading.

e. Product identification labels (such as a label describing a movie) can currently be placed only on the outside of the package. With handling, the label can become loose at the edges or become detached from the package. Form/fill/seal formats will allow the insertion of the identification label into the package so that it cannot become separated from the package f. With the current thermoform systems, the easy open features that can be incorporated into the package are a function of reduced sealability or interply bond strength. In both cases the seal integrity is compromised in applications and products which demand low or no oxygen environments for quality preservation. With form/fill/seal formats there is a variety of easy open methodologies which facilitate product removal and use without sacrifice in package and seal quality. These easy open methodologies include tear notches, scoring to facilitate tearing, strips utilizing foil backed starter tabs, and tear notches cut through the web with a barrier pull tab.

5. Enhanced Scavenging Performance. Since the oxygen scavenging web surface area is doubled, if compared with a conventional thermoformed bottom web and an oxygen scavenging top web, the product shelf life and package performance is enhanced and shelf life is significantly increased, by use of the present invention.

6. UV Blocking

It may be desirable to block any detrimental action of UV from the optical data storage medium. This can accomplished in several ways. A layer can be included in the article that comprises a UV absorber disposed toward the outside of the oxygen scavenging layer (OSL). Such a material will absorb UV and/or be opaque to UV. The article can then, at the desired time, for example at the product packaging line, be triggered by UV irradiation from the opposite side or major surface of the article, which would be chosen to be suitably UV transparent. Suitable UV absorbers are for example, polymeric UV absorbing materials such as polyethylene terephthalate (PET), saran (polyvinylidene dichloride or PVDC), saran coated PET, polystyrene, styrene copolymers such as styrene/butadiene copolymer, styrene/methyl acrylate copolymer, and ethylene/styrene copolymer, aromatic polyamides, and polycarbonate. Such materials will readily block short wave length UV light (UV-C) and to some extent longer wavelength UV. When longer wavelength UV light (UV-B and UV-A) also needs to be blocked, polymers such as polyethylene naphthalate (PEN) can be used. Blends and/or copolymers of any of these materials can also be used as on or more discrete layers in the web structure.

Additives can be used, in addition to or in lieu of the UV absorbing materials disclosed above, to absorb and/or block UVC, UV-A and UV-B. These are well known in the art as sunscreens. Examples are substituted 2-hydroxybenzophenones, substituted benzotriazoles and substituted cinnamates, and pigments such as titanium dioxide, iron oxide, zinc oxide, carbon black, and aluminum oxide, and the like. Particularly preferred are substituted benztriazoles available from Ciba Specialty Chemicals under the trade name TINUVIN®. Also preferred are optical brighteners such as UVITEX® OB also available from Ciba. Optical brighteners can be used to counter act the tendency of UV absorbers to yellow the web, which may be aesthetically unappealing.

The UV absorbing materials, which absorb and/or block UV radiation, can be disposed at any suitable location in the structure of the article. For example, a film or wall layer or layers or a portion or component thereof, a film or wall surface or a portion or component thereof, the print or over print varnish or a portion or component thereof. So long as the UV absorber or additive is effective for the intended purpose of blocking UV radiation from the optical data storage medium without interfering with triggering an oxygen scavenger present in the article.

Those skilled in the art will understand that modifications in the invention can be made without departing from the scope of the invention as claimed in the claims that follow.

For example, the primary package containing the optical data storage medium can be further combined with a discrete paper or plastic member to provide a hanger or header. A barrier containing paperboard, plastic or foam could be utilized as the semi-rigid thermoformed web while providing a hanger, header and/or pegboard notch. Such a package could be designed to have multiple leaves and could contain multiple discs. Packages containing multiple discs would provide separate compartments for them to be opened independently. In this format, a paperboard insert or booklet could provide additional rigidity along with the thermoformed web. A paper or paperboard insert could allow greater contact with more surface area of the scavenging web(s) by virtue of being oxygen permeable.

An alternative embodiment involves a MAP package utilizing an oxygen scavenging sachet. The package could further incorporate a standard "jewel case" to hold the optical data storage medium (or half a jewel case). Humidity control in this type package is also beneficial. Humidity control agents could optionally be incorporated into the oxygen scavenging sachet.

Colored patches can be used to illustrate for the consumer what a good and an expired optical data storage medium look like.

To facilitate the limited lifetime chemistry, it can be desirable to control or modify the relative humidity within the package. This can be achieved by active and passive means including tailored moisture vapor transmission rate (MVTR) by choice of web materials, adding water or humectants to the package, or selectively hydrating layers of the packaging material.

Packages made in accordance with the present invention can beneficially be triggered during the package production process by suitable and well know means, such as subjecting the web (single web) or one or both of the webs (two web embodiments) to actinic radiation. Triggering can be accomplished before the web or webs have been formed into a package; while the package is being made; or after package production.

In yet another embodiment, pouches can be provided pre-triggered. Thus, the pre-triggered pouch includes an oxygen barrier layer or coating, and an oxygen scavenger, of any of the types disclosed herein. Seamed or seamless tubing, or layflat web, can also be provided in a pre-triggered condition.

In one version of this embodiment, the pouch is made on a horizontal form and seal process where a tube of the packaging material is sealed at each end to form a pouch, and before or after pouch formation, the packaging material is triggered as described herein to activate the oxygen scavenger. The pouch can be provided to the packager pre-made, pre-triggered and then later cut open at one end of the pouch, an optical data storage medium is inserted in the pouch, and the pouch is optionally vacuumized and/or optionally flushed with a modified atmosphere (to create an MAP pouch), or compressed, and then resealed. Horizontal tube forming equipment is well known in the art, and provided by vendors such as Multivac.

In another version, a pouch is made as just described, and triggered, but one end of the pouch is left open. One or more of such pouches can then be packaged in a master pack having an oxygen barrier construction, with or without a modified atmosphere or oxygen scavenger sachet to prevent significant scavenging to take place prior to the packaging of the optical data storage medium in each pouch. Alternatively, the pouches with one end open can be simply stacked or rolled up, and the oxygen barrier walls of the pouch will prevent significant oxygen scavenging activity prior to intended use.

Vertical form/fill/seal systems can also be used to form pouches as disclosed herein. Vertical forming systems are well known in the art and are provided by vendors such as Hayssen.

In another alternative embodiment, a film disk can be cut out and placed on at least a portion of the optical data storage medium. This film disk can include an oxygen scavenger, and can be in the form of a mono or multilayered film structure, for example:

Polyethylene/oxygen scavenger/polyethylene

Such a film can be hot blown or cast by otherwise conventional processes.

The film disk can be round to mimic the geometry of the optical data storage medium on which it is installed, or of any other suitable geometry. The edges of the film disk can extend beyond the edges of the optical data storage medium.

In yet another embodiment, the oxygen scavenger can be applied as a coating to at least a portion of the optical data storage medium. Alternatively, a label carrying or including an oxygen scavenger can be affixed to the optical data storage medium.

In still another embodiment, a pellet or wafer, or a flattened sachet, containing an oxygen scavenger, can be placed on the optical data storage medium, with or without affixing the pellet, wafer, or sachet to the optical data storage medium, before the optical data storage medium is placed in a pouch.

Heat shrinkable films can also be used for some or all of the packaging materials employed in packaging the optical data storage medium.

Sealing, vacuumizing, gas flushing, compressing, and other steps disclosed herein can be performed by any suitable and conventional means.

The several alternative embodiments of the invention disclosed herein, and the features of these embodiments, can be used singly or in combination.

For example, any or all of the additional, optional package features of FIGS. 3 through 13, such as a paper flap, paperboard sleeve, view window, human or machine readable unique identifier, antitheft tag, means for opening, easy opening mechanism, tear notch, pull tab, tear strip, reclosable fastener, means for suspending the package, sealed portions spaced apart from the edges of the package, printed indicia, and channels, can be beneficially used, with suitable modification for the package format, to the package format of FIGS. 16 and 18.

EXAMPLES

Two shelf life evaluations were performed using oxygen scavenging films in a pouch form.

The first evaluation was initiated with a web containing poly(ethylene/methyl acrylate/cyclohexene methyl acrylate) (abbreviated as EMCM) and styrene/butadiene block copolymer (VECTOR™) in the oxygen scavenging layer. The web was evaluated under conditions of accelerated temperature and relative humidity (120° F., 75% relative humidity (RH)). Using a standard of greater than or equal to 80% survivability (after 40 days) with the current OS 1000™/T6010B™ films for the top and thermoformed bottom webs of a package, the treatments and shelf life were as follows:

1. Vacuumization using an ULTRAVAC™ vacuum chamber machine—63 days
2. Compression only—42 days
3. Nitrogen Flush/Compression—69 days (Two of the samples exhibited discoloration early in the evaluation. Upon opening the package after pumping/immersion it was noted that the discoloration was not in the DVD but exudate which had somehow transferred to the film. These two samples were discounted.)

The compression was accomplished by squeezing the package between foam rubber sheets prior to sealing on a VERTROD™ sealer. The gas flush was accomplished by inserting a ¼" POLY-FLO™ tubing from a gas bottle. With conventional thermoformed oxygen scavenging packages, using a VECTOR™ styrene/butadiene copolymer oxygen scavenger in a commercial T6010B thermoformed web, a shelf life of 40 to 50 days can be expected when stored at the stated conditions. These data show that non-thermoformed oxygen scavenging pouches can be equal to or more effective than thermoformed oxygen scavenging packages in protecting limited lifetime optical data storage media.

A second evaluation was initiated but not yet completed. In this evaluation, a coextruded multilayer film containing a blend of EMCM and VECTOR™ in an oxygen scavenging layer, was used. In this evaluation, fresh DVD's were packaged in the pouches and held at ambient conditions for 3 weeks, then transferred to an environmental chamber operating at 120 degrees F./75% RH.

The treatments and shelf life after placement in the environmental chamber is as follows:
1. Compression/Nitrogen Flush/Compression. —42 days and counting with 85% survival.
2. Compression only—42 days and counting with 100% survival.

These results indicate that despite the variation and inconsistencies in preparing the packages in these evaluations, an oxygen scavenging non-thermoformed pouch format appears to be a viable alternative to the current oxygen scavenging thermoformed pouches, in that all forms of oxygen removal resulted in a shelf life equal to or better than that exhibited by a thermoformed pouch.

It should be noted when considering the various embodiments of the invention disclosed herein, that in embodiments where two webs are used to form the pouch, neither of the webs is thermoformed, and both of the webs begin the package production process as a layflat film. In embodiments where one web is used to form the pouch, the web is not thermoformed, and the web begins the package production process as a flat centerfolded film, or a layflat tube. The individual channels of FIG. 13 can be formed e.g. by a thermoforming process, but the overall web within which these channels are formed will still comprise an essentially lay flat, non-thermoformed web. Thus, in the present invention, including the embodiment of FIG. 13, a cavity for housing or accommodating an optical data storage medium is not produced or provided by thermoforming.

Figure 19:
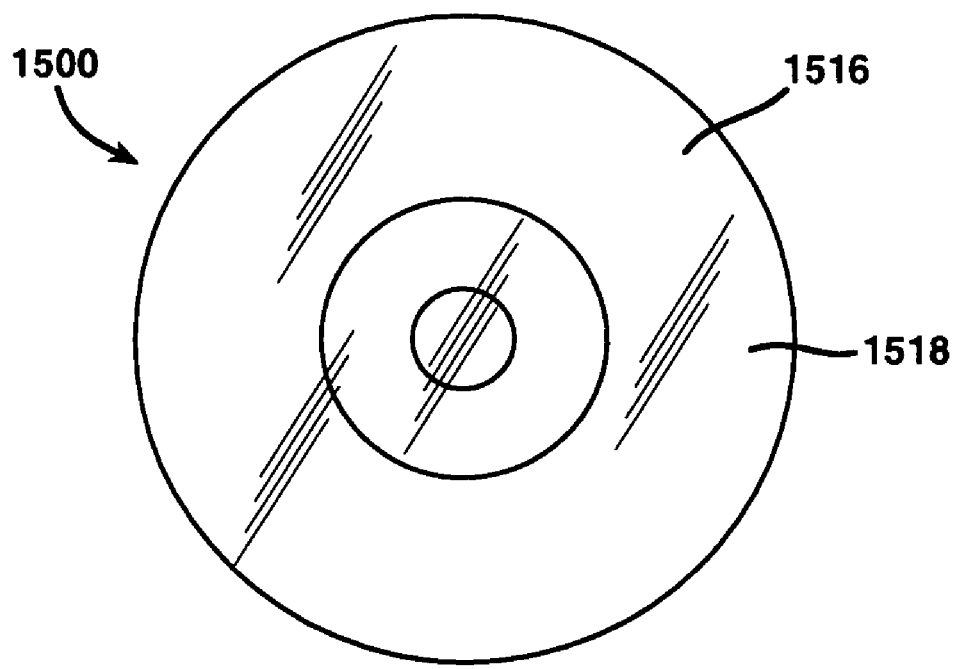
FIG. 19 is a plan view of an alternative embodiment of a package in accordance with the invention.
Figure 20:
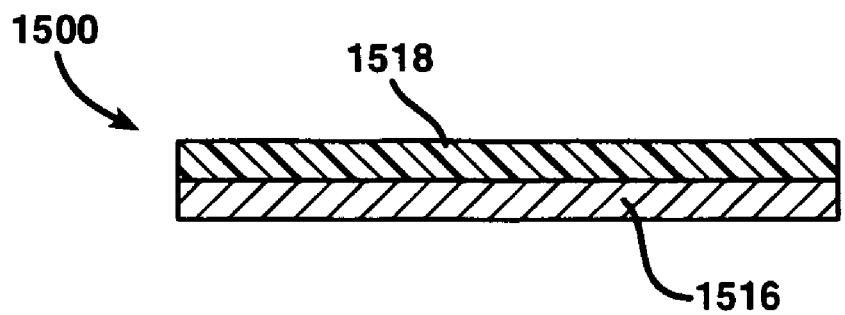
FIG. 20 is a side elevational view (not to scale) of the package of FIG. 19.

In yet another embodiment, where an optical data storage medium includes one metallized side that can function as an oxygen barrier layer, the optical data storage medium can be coated with an oxygen scavenger, or an oxygen scavenger web can be adhered to on the non-oxygen barrier side of the optical data storage medium. In the case of an oxygen scavenger web, the oxygen scavenger web can be in the form of a disc congruent with the geometry of the optical data storage medium. Additional protection of the optical data storage medium may be required to prevent or negate the ingress of oxygen on the circumferential edge of the optical data storage medium, and the central aperture in the optical data storage medium. This can be addressed e.g. through additional protective packaging around the edge of the optical data storage medium, or a redesign of the optical data storage medium itself to prevent oxygen ingress in this manner. In this embodiment, to protect the thus coated or laminated optical data storage medium from damage, the coated or laminated optical data storage medium can optionally be further packaged in a paperboard or plastic sleeve of any suitable type, e.g. as discussed herein and depicted in FIG. 3. This embodiment is illustrated in FIGS. 19 and 20, where an optical data storage medium 1516 has adhered to it a disc of web 1518 to form a web coated optical data storage medium 1500. The web 1518 itself can be of any suitable monolayer or multilayer construction, as disclosed herein, and beneficially includes an oxygen scavenger layer, and an oxygen barrier layer positioned in the web such that, when the disc of web 1518 is attached or adhered to a surface of optical data storage medium 1516, the oxygen scavenger layer is disposed between the relevant surface of the optical data storage medium 1516, and the oxygen barrier layer of web 1518.

Figure 21:
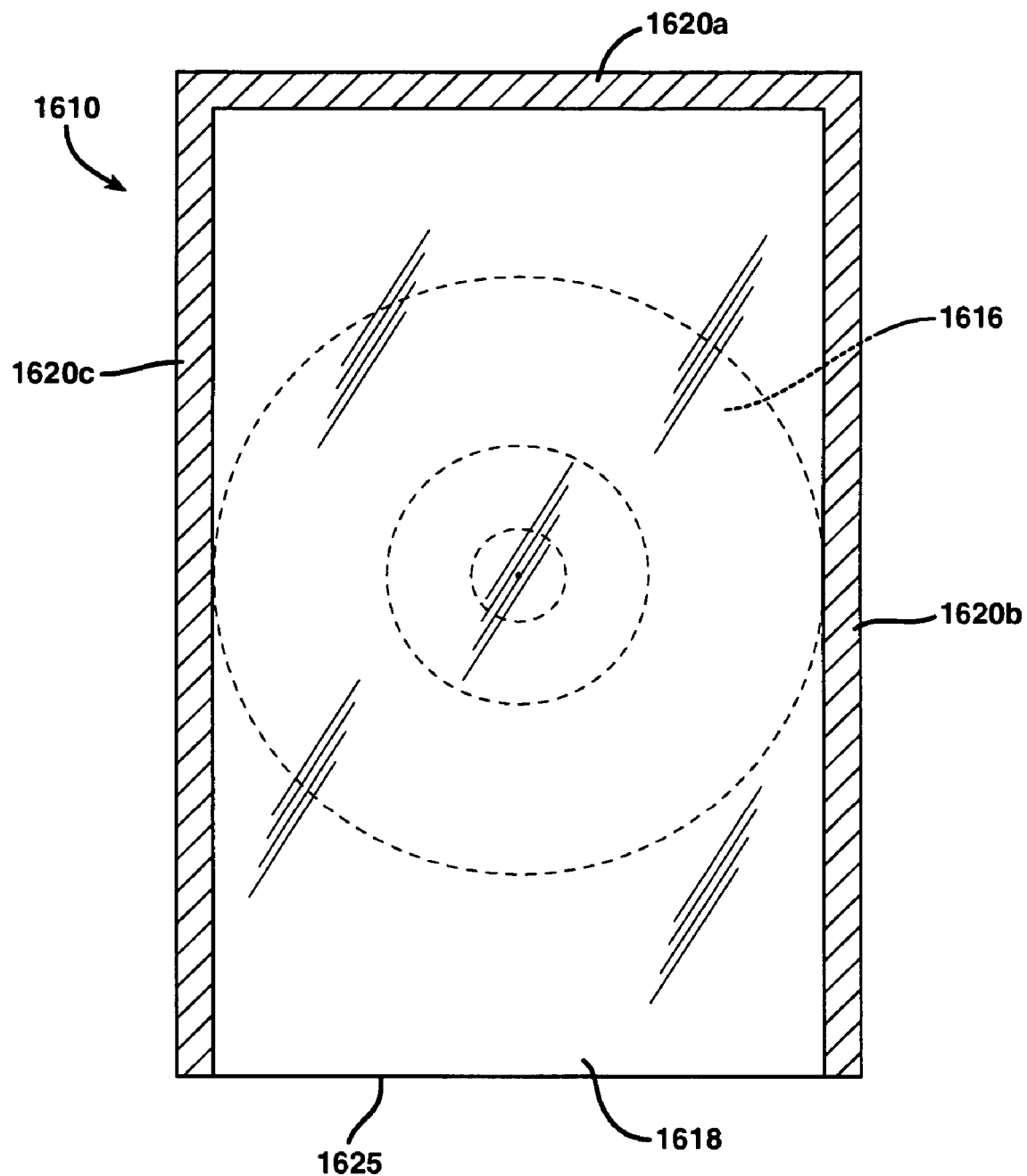
FIG. 21 is a plan view of yet another alternative embodiment of a package in accordance with the invention.

FIG. 21 shows an alternate embodiment 1610 in which an optical data storage medium 1616 is contained in a pouch made from a web 1618. The package has seals 1620a, 1620b, and 1620c. The package also has a feature 1625 which can represent either a web fold or a closed pouch mouth that has not yet been sealed. In one embodiment, the package 1610 can be made in an otherwise conventional L-bar sealer, where a centerfolded film is used to package a plurality of optical data storage medium units. The L-bar sealer can form seals 1620a and 1620b, and subsequently or simultaneously, the third seal 1620c can be formed as a longitudinal edge seal by well know means, including heat or ultrasonic sealing. In an alternative embodiment, the package 1610 can represent an individual vertical pouch made in an HFFS process, where a web has been folded upward, 1625 representing the bottom fold of the final pouch. Side seals 1620b and 1620c are formed, e.g. by heat sealing, to form the vertical pouch. An optical data storage medium is then dropped or otherwise inserted into the interior of the pouch, and the open top mouth of the pouch is then sealed closed to form top seal 1620a.

Figure 22:
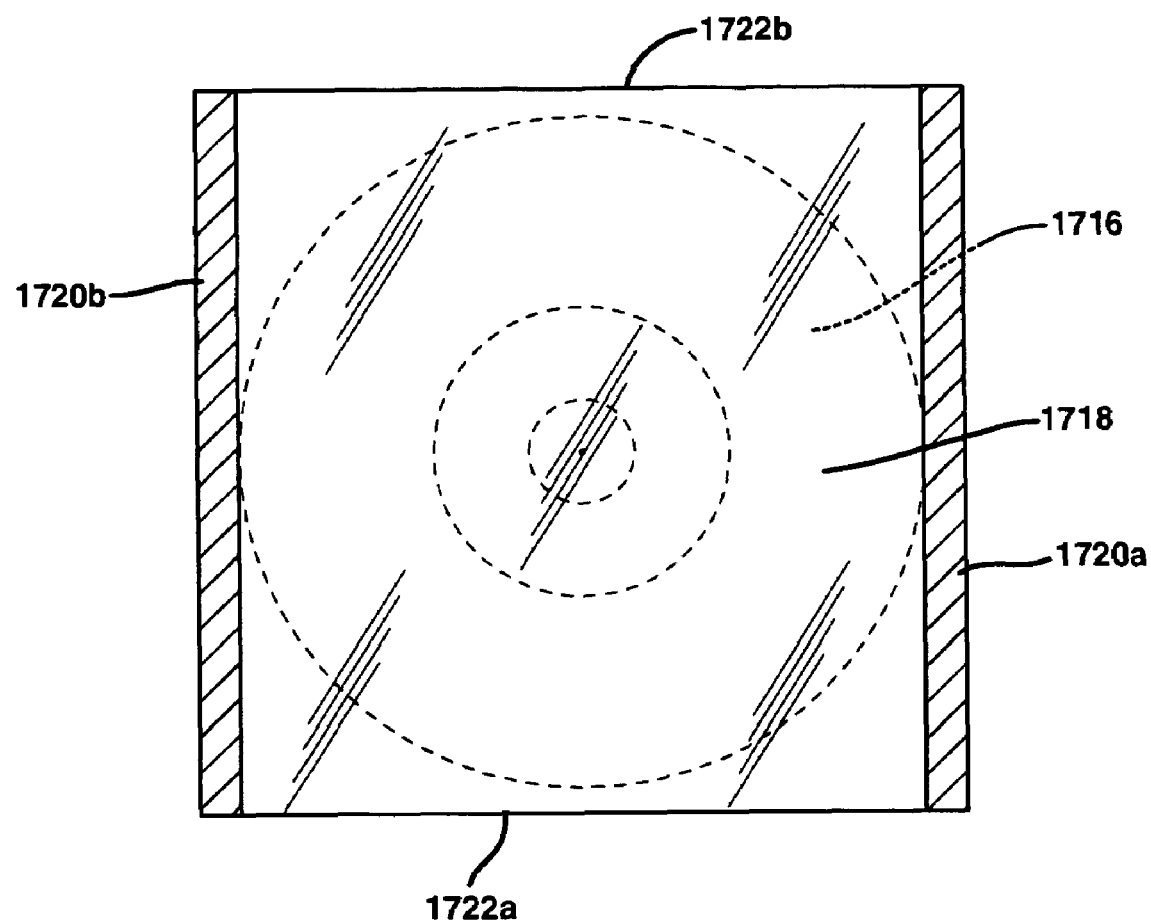
FIG. 22 is a plan view of still another alternative embodiment of a package in accordance with the invention.

Although various embodiments of the invention are illustrated in the drawings with some lateral distance between the optical data storage medium and the adjacent edges of the pouch, an advantage of a non-thermoformed pouch of the invention is that a smaller package can be made, in which the edges of the pouch are relatively close to the nearest proximate edge of the optical data storage medium. This embodiment is illustrated in FIG. 22, where optical data storage medium 1716 is packaged in a pouch made from web 1718 as disclosed in any of the embodiments disclosed herein, but in which the seals 1720a and 1720b, as well as web folds 1722a and 1722b, are in close juxtaposition to the circumferential edge of optical data storage medium 1716. One or more of the edges, folds, or seals can in fact be immediately adjacent a respective portion of the circumferential edge of optical data storage medium 1716. Less material can thus be used to package an optical data storage medium of a given size. Also, in a format where the perimeter edges/seals of the pouch are close to the optical data storage medium, the optical data storage medium will be stabilized inside the pouch and less likely to shift within the pouch. Other means of stabilizing the disc inside the pouch include heat sealing the pouch to itself through the central aperture of the disc.

What is claimed is:
1. A package for containing an optical data storage medium comprising:
 a) a pouch comprising
  i) a non-thermoformed first lay-flat web, and
  ii) a non-thermoformed second lay-flat web; each of the non-thermoformed first and second lay-flat webs comprising
   (a) an oxygen barrier layer comprising one or more materials selected from the group consisting of
    (i) metal foil,
    (ii) metalized polyethylene terephthalate,

(iii) metalized polyamide,
     (iv) metalized polypropylene,
     (v) an SiOx coating, and
     (vi) an AlOx coating;
   (b) an oxygen scavenger layer comprising one or more materials selected from the group consisting of
     i) a reduced form of a quinone, a photoreducible dye, or a carbonyl compound which has absorbence in the UV spectrum,
     ii) a polymer having a polymeric backbone, cyclic olefinic pendent group, and linking group linking the olefinic pendent group to the polymeric backbone; and a transition metal catalyst,
     iii) diene polymer selected from cis and trans 1,4-polybutadiene, 1,2-polybutadiene, and styrene-butadiene copolymer; and a transition metal catalyst,
     iv) a polymer or oligomer having at least one cyclohexene group, and a transition metal salt, compound, or complex, wherein the polymer or oligomer is prepared from the reaction of a tetrahydrophthalic anhydride with at least one of a diol, a hydroxy compound, or a polyhydroxy compound,
     v) a polymer or oligomer having at least one cyclohexene group, and a transition metal salt, compound, or complex, wherein the polymer or oligomer is prepared from the reaction of a tetrahydrobenzyl alcohol with one or more compounds having an ester functionality,
     vi) a condensation polymer of metaxylylenediamine and adipic acid, and
     vii) oxygen scavenging polyester; and
   (c) a sealant layer comprising an ethylene homopolymer or copolymer;
   the first lay-flat web and second lay-flat web sealed together at their respective edges to form a perimeter seal; and
b) an optical data storage medium disposed in the pouch; wherein the pouch comprises
a means for suspending the package, the means for suspending the package disposed in an upper portion of the package;
a means for opening the package, in the form of a tear notch, the means for opening the package disposed at an edge of the package; and
printed indicia disposed on at least one of the first and second lay-flat webs.

2. The package of claim 1 comprising a sleeve in which the package is stored.

3. The package of claim 1 comprising a means for visually determining when the optical data storage medium has become inactive.

4. The package of claim 3 wherein the means for visually determining when the optical data storage medium has become inactive, comprises a window disposed in the pouch, the window adapted to give an indicative color when the optical data storage medium becomes non-readable.

5. The package of claim 1 comprising at least one channel disposed in the package between at least a portion of the first and second lay-flat webs.

6. A package for containing an optical data storage medium comprising:
a) a pouch comprising
   i) a single non-thermoformed lay-flat web, the lay-flat web centerfolded on itself to form a first panel and a second panel, wherein the first and second panel are attached at one end by a bottom fold; the single lay-flat web comprising
   (a) an oxygen barrier layer comprising one or more materials selected from the group consisting of
     (i) metal foil,
     (ii) metalized polyethylene terephthalate;
     (iii) metalized polyamide;
     (iv) metalized polypropylene;
     (v) an SiOx coating; and
     (vi) an AlOx coating;
   (b) an oxygen scavenger layer comprising one or more materials selected from the group consisting of
     i) a reduced form of a quinone, a photoreducible dye, or a carbonyl compound which has absorbence in the UV spectrum,
     ii) a polymer having a polymeric backbone, cyclic olefinic pendent group, and linking group linking the olefinic pendent group to the polymeric backbone; and a transition metal catalyst,
     iii) diene polymer selected from cis and trans 1,4-polybutadiene, 1,2-polybutadiene, and styrene-butadiene copolymer; and a transition metal catalyst,
     iv) a polymer or oligomer having at least one cyclohexene group, and a transition metal salt, compound, or complex, wherein the polymer or oligomer is prepared from the reaction of a tetrahydrophthalic anhydride with at least one of a diol, a hydroxy compound, or a polyhydroxy compound,
     v) a polymer or oligomer having at least one cyclohexene group, and a transition metal salt, compound, or complex, wherein the polymer or oligomer is prepared from the reaction of a tetrahydrobenzyl alcohol with one or more compounds having an ester functionality,
     vi) a condensation polymer of metaxylylenediamine and adipic acid, and
     vii) oxygen scavenging polyester; and
   (c) a sealant layer comprising an ethylene homopolymer or copolymer;
   the first and second panels heat sealed together on at least two sides of the perimeter of the pouch; and
b) an optical data storage medium disposed in the pouch; wherein the pouch comprises
a means for suspending the package, the means for suspending the package disposed in an upper portion of the package;
a means for opening the package, in the form of a tear notch, the means for opening the package disposed at an edge of the package; and
printed indicia disposed on at least one of the first and second panels.

7. The package of claim 6 comprising a sleeve in which the package is stored.

8. The package of claim 6 comprising a means for visually determining when the optical data storage medium has become inactive.

9. The package of claim 8 wherein the means for visually determining when the optical data storage medium has become inactive, comprises a window disposed in the pouch, the window adapted to give an indicative color when the optical data storage medium becomes non-readable.

10. The package of claim 6 comprising at least one channel disposed in the package between at least a portion of the first and second lay-flat webs.

11. The package of claim 6 wherein the first and second panels are heat sealed together in the region of the bottom fold.

* * * * *